United States Patent
Cha et al.

(10) Patent No.: US 11,877,250 B2
(45) Date of Patent: Jan. 16, 2024

(54) METHOD FOR TRANSMITTING AND RECEIVING SIGNALS, AND APPARATUS FOR SUPPORTING SAME IN WIRELESS COMMUNICATION SYSTEM

(71) Applicant: LG Electronics Inc., Seoul (KR)

(72) Inventors: Hyunsu Cha, Seoul (KR); Kijun Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 33 days.

(21) Appl. No.: 17/608,365

(22) PCT Filed: May 4, 2020

(86) PCT No.: PCT/KR2020/005903
§ 371 (c)(1),
(2) Date: Nov. 2, 2021

(87) PCT Pub. No.: WO2020/222618
PCT Pub. Date: Nov. 5, 2020

(65) Prior Publication Data
US 2022/0264491 A1    Aug. 18, 2022

Related U.S. Application Data

(60) Provisional application No. 62/909,764, filed on Oct. 2, 2019.

(30) Foreign Application Priority Data

May 2, 2019  (KR) .......................... 10-2019-0051797

(51) Int. Cl.
*H04W 56/00* (2009.01)
*H04J 13/00* (2011.01)
(Continued)

(52) U.S. Cl.
CPC ....... *H04W 56/001* (2013.01); *H04J 13/0029* (2013.01); *H04L 5/0051* (2013.01); *H04L 27/2613* (2013.01)

(58) Field of Classification Search
None
See application file for complete search history.

(56) References Cited

U.S. PATENT DOCUMENTS

| 8,654,727 B2* | 2/2014 | Dai ........................ H04W 64/00 370/329 |
| 2010/0195566 A1* | 8/2010 | Krishnamurthy ..... H04L 5/0007 370/328 |
| 2010/0232543 A1* | 9/2010 | Sampath ................... G01S 1/24 375/295 |

(Continued)

OTHER PUBLICATIONS

Catt, "DL and UL Reference Signals for NR Positioning", R1-1905346, 3GPP TSG RAN WG1 #96bis, Xi'an, China, Apr. 8-12, 2019, 29 pages.

(Continued)

*Primary Examiner* — Alpus Hsu
*Assistant Examiner* — Camquyen Thai
(74) *Attorney, Agent, or Firm* — Fish & Richardson P.C.

(57) ABSTRACT

Disclosed are a method and an apparatus for supporting same, the method carried out by a terminal in a wireless communication system comprising the steps of: receiving a synchronization signal/physical broadcast channel (SS/PBCH) block comprising a primary synchronization signal (PSS), a secondary synchronization signal (SSS), and a physical broadcast channel (PBCH); receiving system information on the basis of the SS/PBCH block; receiving information associated with a positioning reference signal (PRS) sequence identifier (ID) after receiving the system information; and receiving a PRS associated with the PRS sequence ID, wherein a pseudo-random sequence generator associated with sequence generation of a PRS is initialized by (I) where M is a natural number, K is the number of (Continued)

orthogonal frequency division multiplexing (OFDM) symbols per slot, (II) is a slot index, (III) is an OFDM symbol index within the slot, (IV) is the PRS sequence ID, and mod is a modulo calculation.

13 Claims, 31 Drawing Sheets

(51) Int. Cl.
  *H04L 5/00* (2006.01)
  *H04L 27/26* (2006.01)

(56) References Cited

U.S. PATENT DOCUMENTS

| | | | |
|---|---|---|---|
| 2016/0134402 A1* | 5/2016 | Park | H04L 27/2663 370/329 |
| 2017/0164143 A1 | 6/2017 | Huang et al. | |
| 2019/0097874 A1 | 3/2019 | Zhou et al. | |
| 2022/0123879 A1* | 4/2022 | Munier | H04W 56/001 |

OTHER PUBLICATIONS

Intel Corporation, "Downlink and Uplink Reference Signals for NR Positioning", R1-1904320, 3GPP TSG RAN WG1 Meeting #96bis, Xi'an, China, Apr. 8-12, 2019, 14 pages.

International Search Report and Written Opinion in International Appln. No. PCT/KR2020/005903, dated Aug. 24, 2020, 19 pages.

Technical Specification Group Radio Access Network, "Evolved Universal Terrestrial Radio Access (E-UTRA); Physical channels and modulation (Release 15)", 3GPP TS 36.211 V15.5.0 (Mar. 2019), 234 pages.

* cited by examiner (a)

(b)

(a)

(b)

METHOD FOR TRANSMITTING AND RECEIVING SIGNALS, AND APPARATUS FOR SUPPORTING SAME IN WIRELESS COMMUNICATION SYSTEM

CROSS-REFERENCE TO RELATED APPLICATIONS

This application is a National Stage application under 35 U.S.C. § 371 of International Application No. PCT/KR2020/005903, filed on May 4, 2020, which claims the benefit of U.S. Provisional Application No. 62/909,764, filed on Oct. 2, 2019, and Korean Application No. 10-2019-0051797, filed on May 2, 2019. The disclosures of the prior applications are incorporated by reference in their entirety.

TECHNICAL FIELD

Various embodiments of the present disclosure relate to a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

Various embodiments of the present disclosure may provide a method of transmitting and receiving a signal in a wireless communication system and apparatus for supporting the same.

According to the various embodiments of the present disclosure, a positioning method in a wireless communication system and apparatus for supporting the same may be provided.

According to the various embodiments of the present disclosure, a method of generating/obtaining/transmitting and receiving a positioning reference signal (PRS) in a wireless communication system and apparatus for supporting the same may be provided.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

Various embodiments of the present disclosure may provide a method of transmitting and receiving a signal in a wireless communication system and apparatus for supporting the same.

According to the various embodiments of the present disclosure, a method performed by a user equipment (UE) in a wireless communication system may be provided.

In an exemplary embodiment, the method may include: receiving a synchronization signal/physical broadcast channel (SS/PBCH) block including a primary synchronization signal (PSS), a secondary synchronization signal (SSS), and a physical broadcast channel (PBCH); receiving system information based on the SS/PBCH block; receiving information related to a positioning reference signal (PRS) sequence identifier (ID) after the reception of the system information; and receiving a PRS related to the PRS sequence ID.

In an exemplary embodiment, a pseudo-random sequence generator related to sequence generation of the PRS may be initialized according to the following equation:

$$c_{init} = \left( 2^{31-(M-10)} \left\lfloor \frac{N_{ID}^{RS}}{2^{10}} \right\rfloor + \right.$$
$$\left. 2^{10}(K \cdot n_s + l + 1)(2 \cdot (N_{ID}^{RS} \bmod 1024) + 1) + N_{ID}^{RS} \bmod 1024 \right) \bmod 2^{31}.$$

In an exemplary embodiment, M may be a natural number, K may be a number of orthogonal frequency division multiplexing (OFDM) symbols per slot, $n_s$ may be a slot index, l may be an OFDM symbol index within a slot, $N^{RS}_{ID}$ may be the PRS sequence ID, and mod may be a modular operation.

In an exemplary embodiment, $N^{RS}_{ID}$ may be configured by a higher layer.

In an exemplary embodiment, the following relationship: $N^{RS}_{ID} \in \{0, 1, \ldots, 2^{19-1}\}$ may be satisfied.

In an exemplary embodiment, M may be a natural number greater than 10 and smaller than 31.

In an exemplary embodiment, M may be 19.

In an exemplary embodiment, a sequence of the PRS may satisfy a value obtained from a predetermined length-31 Gold sequence.

In an exemplary embodiment, the method may further include: receiving configuration information including: (i) information on a PRS resource; (ii) information on a PRS resource set including the PRS resource; and (iii) information on a transmission and reception point (TRP) ID.

In an exemplary embodiment, the PRS may be received based on the configuration information According to the various embodiments of the present disclosure, an apparatus in a wireless communication system may be provided.

In an exemplary embodiment, the apparatus may include: a memory; and at least one processor coupled with the memory.

In an exemplary embodiment, the at least one processor may be configured to: receive an SS/PBCH block including a PSS, an SSS, and a PBCH; receive system information based on the SS/PBCH block; receive information related to a PRS sequence ID after the reception of the system information; and receive a PRS related to the PRS sequence ID.

In an exemplary embodiment, a pseudo-random sequence generator related to sequence generation of the PRS may be initialized according to the following equation:

$$c_{init} = \left( 2^{31-(M-10)} \left\lfloor \frac{N_{ID}^{RS}}{2^{10}} \right\rfloor + 2^{10}(K \cdot n_s + l + 1)(2 \cdot (N_{ID}^{RS} \bmod 1024) + 1) + N_{ID}^{RS} \bmod 1024 \right) \bmod 2^{31}.$$

In an exemplary embodiment, M may be a natural number, K may be a number of OFDM symbols per slot, $n_s$ may be a slot index, l may be an OFDM symbol index within a slot, $N_{ID}^{RS}$ may be the PRS sequence ID, and mod may be a modular operation.

In an exemplary embodiment, $N_{ID}^{RS}$ may be configured by a higher layer.

In an exemplary embodiment, the following relationship: $N_{ID}^{RS} \in \{0, 1, \ldots, 2^{19-1}\}$ may be satisfied.

In an exemplary embodiment, M may be 19.

In an exemplary embodiment, a sequence of the PRS may satisfy a value obtained from a predetermined length-31 Gold sequence.

In an exemplary embodiment, the apparatus may be configured to communicate with at least one of a mobile terminal, a network, or an autonomous driving vehicle other than a vehicle including the apparatus.

According to the various embodiments of the present disclosure, a method performed by an apparatus in a wireless communication system may be provided.

In an exemplary embodiment, the method may include: transmitting an SS/PBCH block including a PSS, an SSS, and a PBCH; transmitting system information after the transmission of the SS/PBCH block; transmitting information related to a PRS sequence ID after the transmission of the system information; and transmitting a PRS related to the PRS sequence ID.

In an exemplary embodiment, a pseudo-random sequence generator related to sequence generation of the PRS may be initialized according to the following equation:

$$c_{init} = \left( 2^{31-(M-10)} \left\lfloor \frac{N_{ID}^{RS}}{2^{10}} \right\rfloor + 2^{10}(K \cdot n_s + l + 1)(2 \cdot (N_{ID}^{RS} \bmod 1024) + 1) + N_{ID}^{RS} \bmod 1024 \right) \bmod 2^{31}.$$

In an exemplary embodiment, M may be a natural number, K may be a number of OFDM symbols per slot, $n_s$ may be a slot index, l may be an OFDM symbol index within a slot, $N_{ID}^{RS}$ may be the PRS sequence ID, and mod may be a modular operation.

According to the various embodiments of the present disclosure, an apparatus in a wireless communication system may be provided.

In an exemplary embodiment, the apparatus may include: a memory; and at least one processor coupled with the memory.

In an exemplary embodiment, the at least one processor may be configured to: transmit an SS/PBCH block including a PSS, an SSS, and a PBCH; transmit system information after the transmission of the SS/PBCH block; transmit information related to a PRS sequence ID after the transmission of the system information; and transmit a PRS related to the PRS sequence ID.

In an exemplary embodiment, a pseudo-random sequence generator related to sequence generation of the PRS may be initialized according to the following equation:

$$c_{init} = \left( 2^{31-(M-10)} \left\lfloor \frac{N_{ID}^{RS}}{2^{10}} \right\rfloor + 2^{10}(K \cdot n_s + l + 1)(2 \cdot (N_{ID}^{RS} \bmod 1024) + 1) + N_{ID}^{RS} \bmod 1024 \right) \bmod 2^{31}.$$

In an exemplary embodiment, M may be a natural number, K may be a number of OFDM symbols per slot, $n_s$ may be a slot index, l may be an OFDM symbol index within a slot, $N_{ID}^{RS}$ may be the PRS sequence ID, and mod may be a modular operation.

According to the various embodiments of the present disclosure, an apparatus in a wireless communication system may be provided.

In an exemplary embodiment, the apparatus may include: at least one processor; and at least one memory configured to store at least one instruction that causes the at least one processor to perform a method.

In an exemplary embodiment, the method may include: receiving an SS/PBCH block including a PSS, an SSS, and a PBCH; receiving system information based on the SS/PBCH block; receiving information related to a PRS sequence ID after the reception of the system information; and receiving a PRS related to the PRS sequence ID.

In an exemplary embodiment, a pseudo-random sequence generator related to sequence generation of the PRS may be initialized according to the following equation:

$$c_{init} = 2^{31-(M-10)} \left\lfloor \frac{N_{ID}^{RS}}{2^{10}} \right\rfloor + 2^{10}(K \cdot n_s + l + 1)(2 \cdot (N_{ID}^{RS} \bmod 1024) + 1) + N_{ID}^{RS} \bmod 1024 \bmod 2^{31}.$$

In an exemplary embodiment, M may be a natural number, K may be a number of OFDM symbols per slot, $n_s$ may be a slot index, l may be an OFDM symbol index within a slot, $N_{ID}^{RS}$ may be the PRS sequence ID, and mod may be a modular operation.

According to the various embodiments of the present disclosure, a processor-readable medium configured to store at least one instruction that causes at least one processor to perform a method may be provided.

In an exemplary embodiment, the method may include: receiving an SS/PBCH block including a PSS, an SSS, and a PBCH; receiving system information based on the SS/PBCH block; receiving information related to a PRS sequence ID after the reception of the system information; and receiving a PRS related to the PRS sequence ID.

In an exemplary embodiment, a pseudo-random sequence generator related to sequence generation of the PRS may be initialized according to the following equation:

$$c_{init} = \left(2^{31-(M-10)}\left\lfloor\frac{N_{ID}^{RS}}{2^{10}}\right\rfloor + \right.$$

$$\left. 2^{10}(K \cdot n_s + l + 1)(2 \cdot (N_{ID}^{RS} \bmod 1024) + 1) + N_{ID}^{RS} \bmod 1024\right)\bmod 2^{31}.$$

In an exemplary embodiment, M may be a natural number, K may be a number of OFDM symbols per slot, $n_s$ may be a slot index, l may be an OFDM symbol index within a slot, $N^{RS}_{ID}$ may be the PRS sequence ID, and mod may be a modular operation.

Various embodiments of the present disclosure as described above are only some of preferred embodiments of the present disclosure, and those skilled in the art may derive and understand many embodiments in which technical features of the various embodiments of the present disclosure are reflected based on the following detailed description.

Advantageous Effects

According to various embodiments of the present disclosure, the following effects may be achieved.

According to the various embodiments of the present disclosure, a method of transmitting and receiving a signal in a wireless communication system and apparatus for supporting the same may be provided.

According to the various embodiments of the present disclosure, a positioning method in a wireless communication system and apparatus for supporting the same may be provided.

According to the various embodiments of the present disclosure, a method of generating/obtaining/transmitting and receiving a positioning reference signal (PRS) in consideration of the characteristics of a new radio access technology or new radio (NR) system supporting various numerologies and apparatus for supporting the same may be provided.

According to the various embodiments of the present disclosure, a PRS generation/acquisition/transmission and reception method capable of lowering the implementation complexity of a user equipment (UE) when a channel state information reference signal (CSI-RS) and a PRS are used together as a reference signal (RS).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the various embodiments of the present disclosure, provide the various embodiments of the present disclosure together with detail explanation. Yet, a technical characteristic the various embodiments of the present disclosure is not limited to a specific drawing. Characteristics disclosed in each of the drawings are combined with each other to configure a new embodiment. Reference numerals in each drawing correspond to structural elements.

MODE FOR DISCLOSURE

Figure 1:
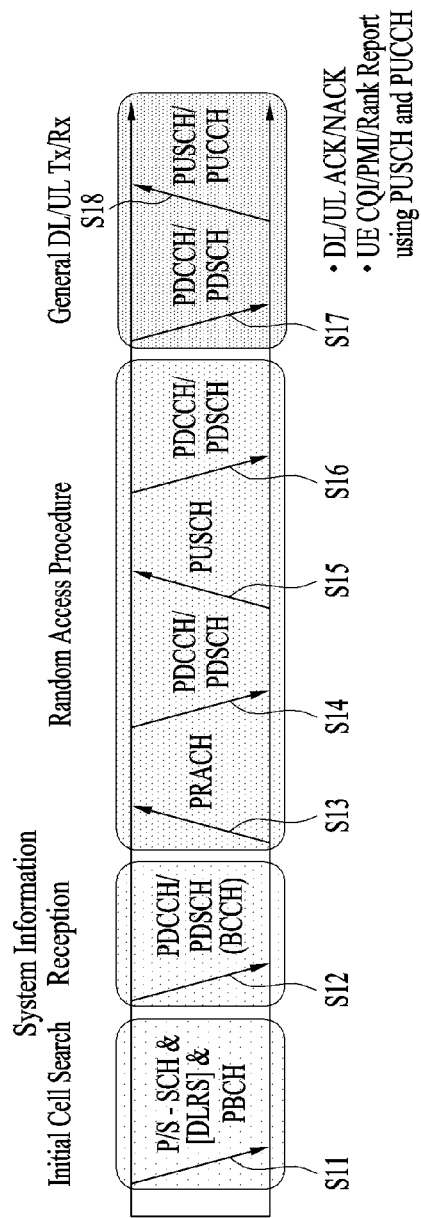
FIG. 1 is a diagram illustrating physical channels and a signal transmission method using the physical channels, which may be used in various embodiments of the present disclosure.

The various embodiments of the present disclosure described below are combinations of elements and features of the various embodiments of the present disclosure in specific forms. The elements or features may be considered selective unless otherwise mentioned. Each element or feature may be practiced without being combined with other elements or features. Further, various embodiments of the present disclosure may be constructed by combining parts of the elements and/or features. Operation orders described in various embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the various embodiments of the present disclosure will be avoided lest it should obscure the subject matter of the various embodiments of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the various embodiments of the present disclosure (more particularly, in the context of the following claims) unless indicated otherwise in the specification or unless context clearly indicates otherwise.

In the various embodiments of the present disclosure, a description is mainly made of a data transmission and reception relationship between a Base Station (BS) and a User Equipment (UE). ABS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the various embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

Various embodiments of the present disclosure may be supported by standard specifications disclosed for at least one of wireless access systems including an institute of electrical and electronics engineers (IEEE) 802.xx system, a $3^{rd}$ generation partnership project (3GPP) system, a 3GPP long term evolution (LTE) system, a 3GPP $5^{th}$ generation (5G) new RAT (NR) system, or a 3GPP2 system. In particular, various embodiments of the present disclosure may be supported by standard specifications including 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, and 3GPP TS 38.455. That is, steps or parts which are not described in various embodiments of the present disclosure may be described with reference to the above standard specifications. Further, all terms used herein may be described by the standard specifications.

Reference will now be made in detail to the various embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the various embodiments of the present disclosure. However, it will be apparent to those skilled in the art that the specific terms may be replaced with other terms without departing the technical spirit and scope of the various embodiments of the present disclosure.

Hereinafter, 3GPP LTE/LTE-A systems and 3GPP NR system are explained, which are examples of wireless access systems.

The various embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure are also applicable to an IEEE 802.16e/m system, etc.

1. Overview of 3GPP System 1.1. Physical Channels and General Signal Transmission In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 is a diagram illustrating physical channels and a signal transmission method using the physical channels, which may be used in various embodiments of the present disclosure;

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be combined into one operation for a UE transmission, and steps S14 and S16 may be combined into one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
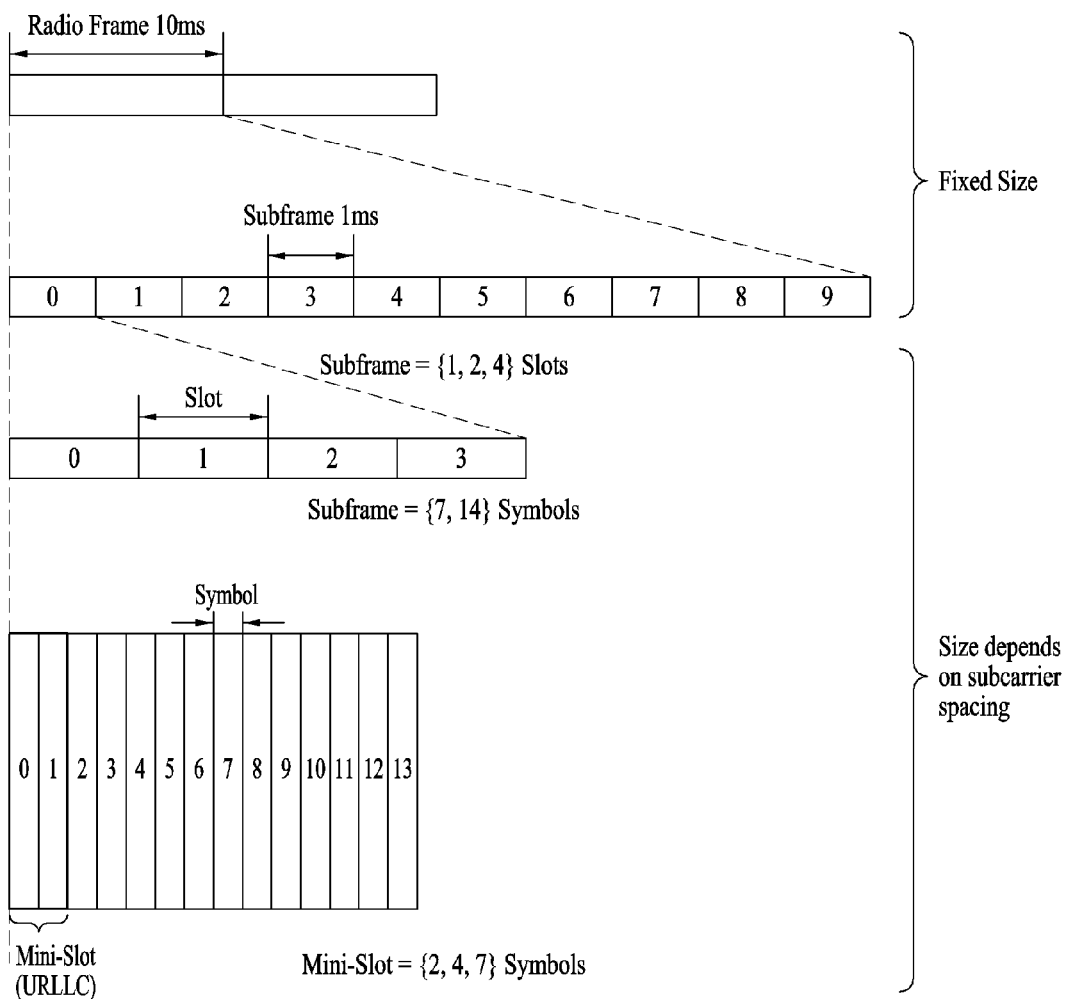
FIG. 2 is a diagram illustrating a radio frame structure in a new radio access technology (NR) system to which various embodiments of the present disclosure are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, μ and a CP are obtained from RRC parameters provided by the BS.

TABLE 1

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 kHz)*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N^{slot}_{symb}$ | $N^{frame,\mu}_{slot}$ | $N^{subframe,\mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N^{slot}_{symb}$ | $N^{frame,\mu}_{slot}$ | $N^{subframe,\mu}_{slot}$ |
| --- | --- | --- | --- |
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
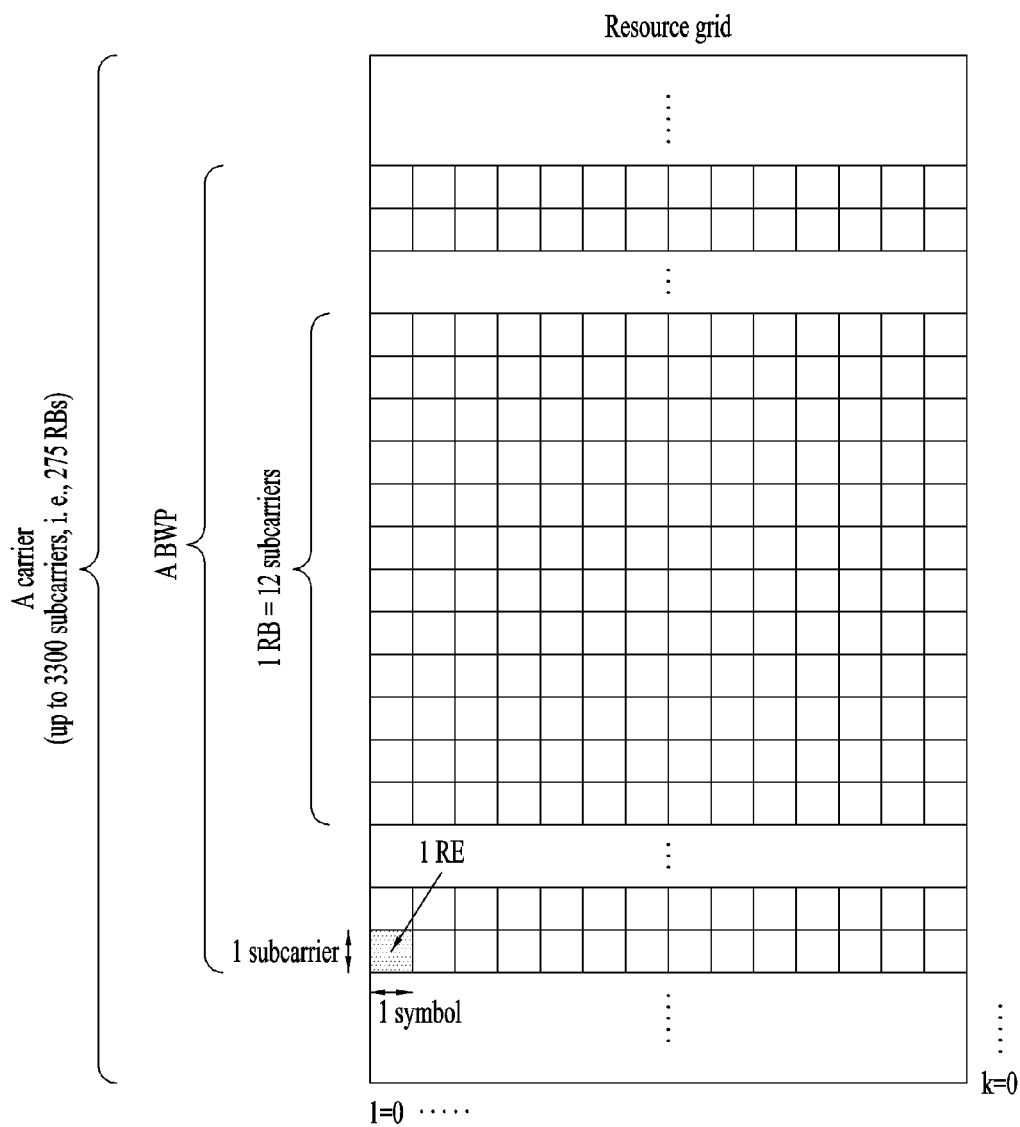
FIG. 3 is a diagram illustrating a slot structure in an NR system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
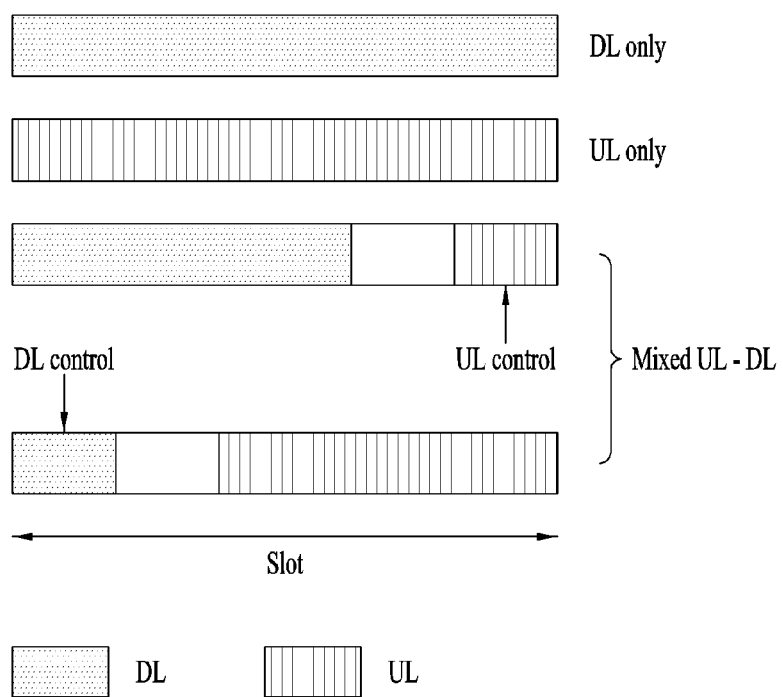
FIG. 4 is a diagram illustrating a self-contained slot structure to which various embodiments of the present disclosure are applicable.

FIG. 4 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 4.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

For each CORESET, a precoder granularity in the frequency domain is set to one of the followings by higher-layer signaling:

smeared-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates for each AL={1, 2, 4, 8, 16} (one of 0, 1, 2, 3, 4, 5, 6, and 8).

Table 5 lists exemplary features of the respective search space types.

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI (s) | |
| | UE Specific | C-RNTI, or MCS-C-RNTI, or CS-RNTI (s) | User specific PDSCH decoding |

Table 6 lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |

TABLE 6-continued

| DCI format | Usage |
|---|---|
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 0 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. Cell Search

Figure 5:
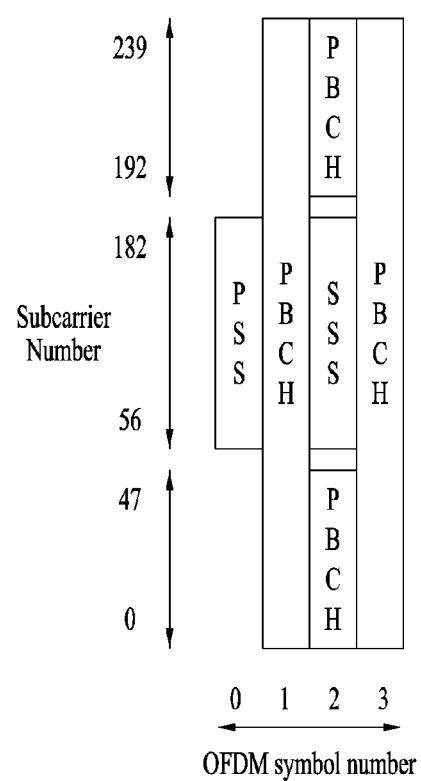
FIG. 5 is a diagram illustrating a synchronization signal block (SSB) structure to which various embodiments of the present disclosure are applicable.

FIG. 5 is a diagram illustrating a synchronization signal block (SSB) structure to which various embodiments of the present disclosure are applicable.

The UE may perform cell search, system information acquisition, beam alignment for initial access, DL measurement, and so on based on an SSB.

Referring to FIG. 5, the SSB includes a PSS, an SSS, and a PBCH. The SSB includes four consecutive OFDM symbols, and the PSS, the PBCH, the SSS/PBCH, and the PBCH are transmitted in the respective OFDM symbols. Each of the PSS and the SSS includes one OFDM symbol by 127 subcarriers, and the PBCH includes three OFDM symbols by 576 subcarriers. Polar coding and QPSK are applied to the PBCH. The PBCH includes data REs and demodulation reference signal (DMRS) REs in every OFDM symbol. There are three DMRS REs per RB, with three data REs between every two adjacent DMRS REs.

Cell search is a process of acquiring time/frequency synchronization with a cell and detecting the identifier (ID) (e.g., physical cell ID (PCID)) of the cell. The PSS is used to detect a cell ID in a cell ID group, and the SSS is used to detect the cell ID group. The PBCH is used to detect an SSB (time) index and a half-frame.

The cell search process of the UE may be summarized in Table 8.

TABLE 8

| Type of Signals | | Operations |
|---|---|---|
| 1st step | PSS | * SS/PBCH block (SSB) symbol timing acquisition<br>* Cell ID detection within a cell ID group (3 hypothesis) |
| 2nd Step | SSS | * Cell ID group detection (336 hypothesis) |

TABLE 8-continued

| Type of Signals | | Operations |
|---|---|---|
| 3$^{rd}$ Step | PBCH DMRS | * SSB index and Half frame (HF) index (Slot and frame boundary detection) |
| 4$^{th}$ Step | PBCH | * Time in (80 ms, System Frame Number (SFN), SSB index, HF) * Remaining Minimum System Information (RMSI) Control resource set (CORESET)/Search space configuration |
| 5$^{th}$ Step | PDCCH and PDSCH | * Cell access information * RACH configuration |

There may be 336 cell ID groups, each including three cell IDs. There may be 1008 cell IDs in total. Information about a cell ID group to which the cell ID of a cell belongs may be provided/obtained through the SSS of the cell, and information about the cell ID among 336 cells in the cell ID may be provided/obtained through the PSS.

Figure 6:
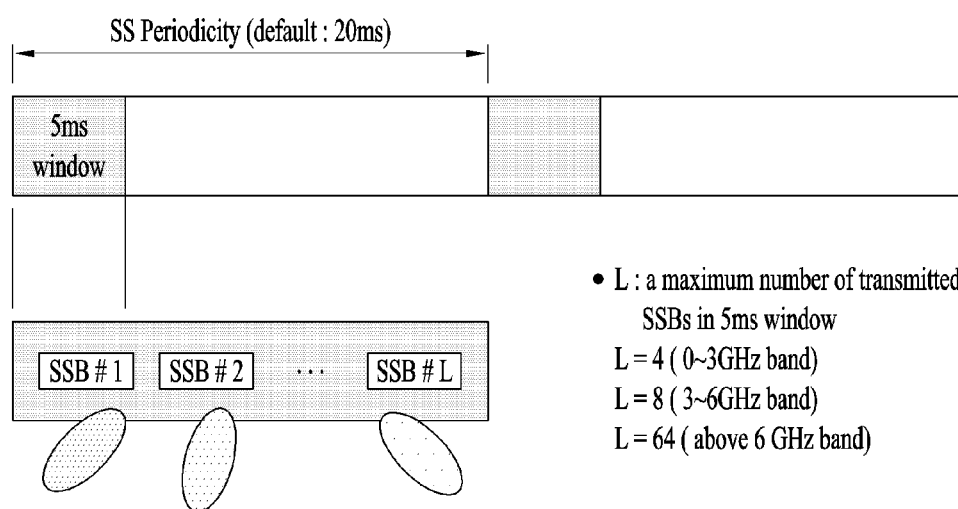
FIG. 6 is a diagram illustrating an exemplary SSB transmission method to which various embodiments of the present disclosure are applicable.

FIG. 6 is an exemplary SSB transmission method to which various embodiments of the present disclosure are applicable.

Referring to FIG. 6, an SSB is periodically transmitted according to an SSB periodicity. A basic SSB periodicity assumed by the UE in the initial cell search is defined as 20 ms. After cell access, the SSB periodicity may be set to one of {5 ms, 10 ms, 20 ms, 40 ms, 80 ms, 160 ms} by the network (e.g., the BS). An SSB burst set is configured at the beginning of an SSB period. The SSB burst set may be configured in a 5-ms time window (i.e., half-frame), and an SSB may be repeatedly transmitted up to L times within the SS burst set. The maximum number L of transmissions of the SSB may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to an SCS as follows. The time positions of SSB candidates are indexed as (SSB indexes) 0 to L−1 in temporal order within the SSB burst set (i.e., half-frame).

Case A: 15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B: 30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C: 30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D: 120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E: 240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

1.5. Beam Alignment

Figure 7:
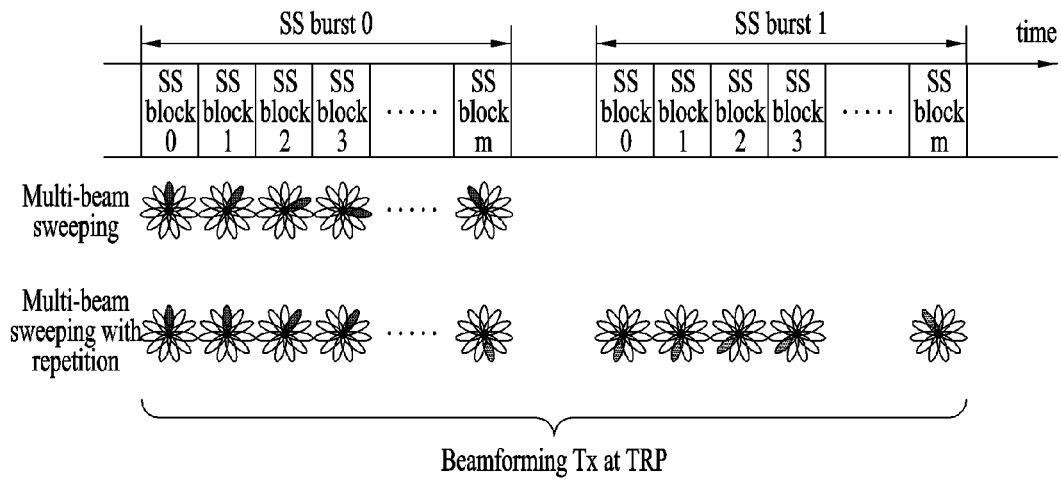
FIG. 7 is a diagram illustrating exemplary multi-beam transmission of SSBs, which is applicable to various embodiments of the present disclosure.

FIG. 7 illustrates exemplary multi-beam transmission of SSBs, which is applicable to various embodiments of the present disclosure.

Beam sweeping refers to changing the beam (direction) of a wireless signal over time at a transmission reception point (TRP) (e.g., a BS/cell) (hereinafter, the terms beam and beam direction are interchangeably used). An SSB may be transmitted periodically by beam sweeping. In this case, SSB indexes are implicitly linked to SSB beams. An SSB beam may be changed on an SSB (index) basis or on an SSB (index) group basis. In the latter case, the same SSB beam is maintained in an SSB (index) group. That is, the transmission (Tx) beam direction of an SSB is repeated over a plurality of successive SSBs. A maximum allowed transmission number L for an SSB in an SSB burst set is 4, 8 or 64 according to the frequency band of a carrier. Accordingly, a maximum number of SSB beams in the SSB burst set may also be given according to the frequency band of a carrier as follows.

For frequency range up to 3 GHz, Max number of beams=4

For frequency range from 3 GHz to 6 GHz, Max number of beams=8

For frequency range from 6 GHz to 52.6 GHz, Max number of beams=64

Without multi-beam transmission, the number of SSB beams is 1.

When the UE attempts initial access to the BS, the UE may align beams with the BS based on an SSB. For example, the UE detects SSBs and then identifies the best SSB. Subsequently, the UE may transmit an RACH preamble in a PRACH resource linked/corresponding to the index (i.e., beam) of the best SSB. The SSB may also be used for beam alignment between the BS and the UE even after the initial access.

1.6. Channel Measurement and Rate-Matching

Figure 8:
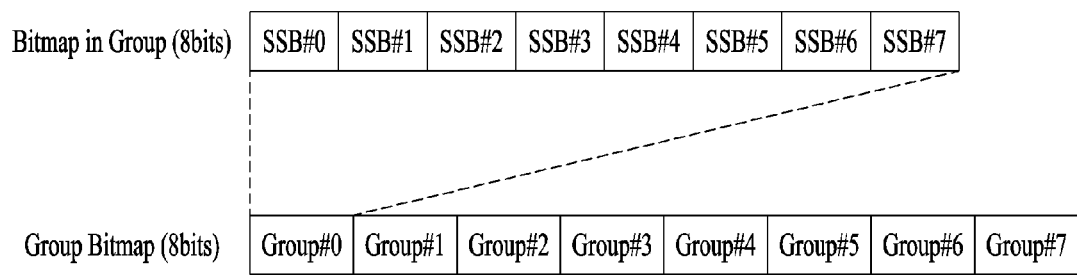
FIG. 8 is a diagram illustrating an exemplary method of indicating an actually transmitted SSB, SSB_tx, which is applicable to various embodiments of the present disclosure.

FIG. 8 is a diagram illustrating an exemplary method of indicating an actually transmitted SSB, SSB_tx, which is applicable to various embodiments of the present disclosure.

Up to L SSBs may be transmitted in an SSB burst set, and the number/positions of actually transmitted SSBs may be different for each BS/cell. The number/positions of actually transmitted SSBs are used for rate-matching and measurement, and information about the actually transmitted SSBs is indicated as follows.

Rate-matching-related: The information may be indicated by UE-specific RRC signaling or RMSI. The UE-specific RRC signaling includes full bitmaps (e.g., of length L) for FR1 and FR2. The RMSI includes a full bitmap for FR1 and a compressed bitmap for FR2 as illustrated. Specifically, the information about actually transmitted SSBs may be indicated by a group bitmap (8 bits)+an in-group bitmap (8 bits). Resources (e.g., REs) indicated by the UE-specific RRC signaling or the RMSI may be reserved for SSB transmission, and a PDSCH/PUSCH may be rate-matched in consideration of the SSB resources.

Measurement-related: In RRC connected mode, the network (e.g., the BS) may indicate an SSB set to be measured within a measurement period. An SSB set may be indicated on a frequency layer basis. In the absence of an indication related to an SSB set, a default SSB set is used. The default SSB set includes all SSBs within a measurement period. The SSB set may be indicated by a full bitmap (e.g., of length L) of RRC signaling. In RRC idle mode, the default SSB set is used.

1.7. QCL (Quasi Co-Located or Quasi Co-Location)

The UE may receive a list of up to M TCI-State configurations to decode a PDSCH according to a detected PDCCH carrying DCI intended for the UE and a given cell. M depends on a UE capability.

Each TCI-State includes a parameter for establishing a QCL relationship between one or two DL RSs and a PDSCH DMRS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info, and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is for a specific NZP CSI-RS, corresponding NZP CSI-RS antenna ports may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

1.8. UL-DL Timing Relationship

Figure 9:
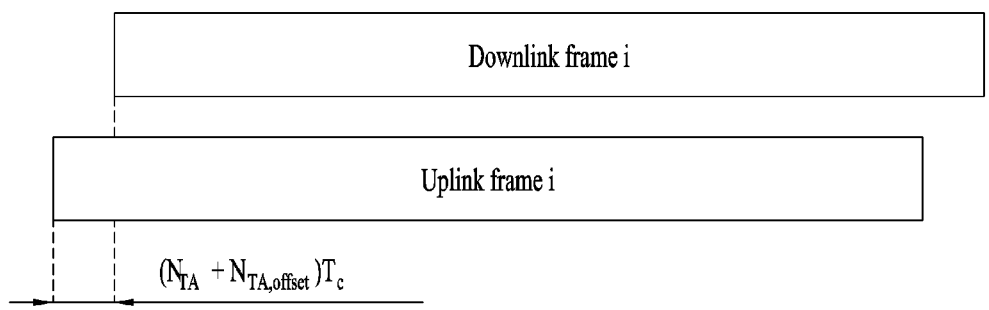
FIG. 9 is a diagram illustrating an exemplary UL-DL timing relationship, which is applicable to various embodiments of the present disclosure.

FIG. 9 is a diagram illustrating an exemplary UL-DL timing relationship applicable to various embodiments of the present disclosure.

Referring to FIG. 9, a UE starts to transmit UL frame i $T_{TA}=(N_{TA}+N_{TA,offset})T_c$ seconds before transmission of a DL radio frame corresponding to UL radio frame i. However, $T_{TA}=0$ is exceptionally used for msgA transmission on a PUSCH.

Each parameter may be defined as described in Table 9 below.

2. Positioning

Positioning may be a process of determining the geographical location and/or speed of a UE based on the measurement of a radio signal. A client (e.g., application) related to the UE may request location information, and the location information may be reported to the client. The location information may be included in a core network or requested by the client connected to the core network. The location information may be reported in a standard format such as cell-based or geographical coordinates. Herein, an estimation error of the location and speed of the UE and/or a positioning method used for the positioning may also be reported.

2.1. Positioning Protocol Configuration

Figure 10:
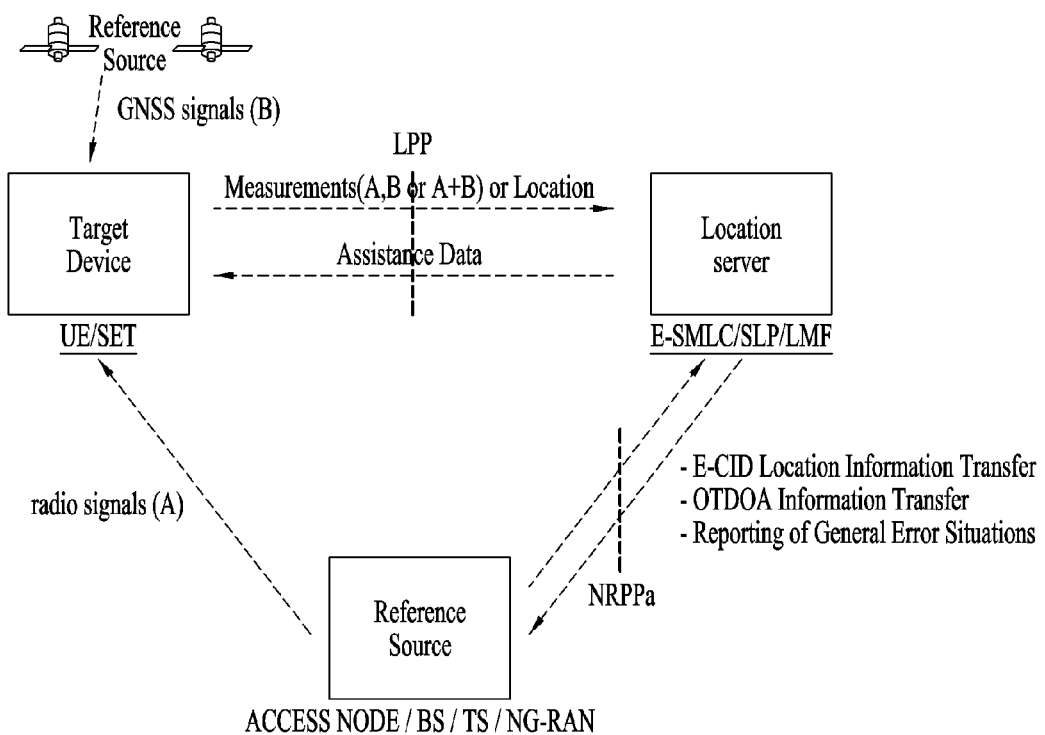
FIG. 10 is a diagram illustrating an exemplary positioning protocol configuration for user equipment (UE) positioning, which is applicable to various embodiments of the present disclosure.

FIG. 10 is a diagram illustrating an exemplary positioning protocol configuration for UE positioning, to which various embodiments of the present disclosure are applicable.

Referring to FIG. 10, an LTE positioning protocol (LPP) may be used as a point-to-point protocol between a location server (E-SMLC and/or SLP and/or LMF) and a target device (UE and/or SET) in order to position a target device based on positioning-related measurements obtained from one or more reference sources. The target device and the location server may exchange measurements and/or location information based on signal A and/or signal B through the LPP.

NR positioning protocol A (NRPPa) may be used for exchanging information between a reference source (access node and/or BS and/or TP and/or NG-RAN node) and a location server.

NRPPa may provide the following functions:

E-CID Location Information Transfer. This function allows exchange of location information between a reference source and an LMF, for the purpose of E-CID positioning.

OTDOA Information Transfer. This function allows exchange of information between the reference source and the LMF for the purpose of OTDOA positioning.

Reporting of General Error Situations. This function allows reporting of general error situations, for which function specific error messages have not been defined.

TABLE 9

$N_{TA}$
In case of random access response, a timing advance command [11, TS 38.321], $T_A$, for a TAG indicates $N_{TA}$ values by index values of $T_A = 0, 1, 2, \ldots, 3846$, where an amount of the time alignment for the TAG with SCS of $2^\mu \cdot 15$ kHz is $N_{TA} = T_A \cdot 16 \cdot 64/2^\mu$. $N_{TA}$ is defined in [4, TS 38.211] and is relative to the SCS of the first uplink transmission from the UE after the reception of the random access response.
In other cases, a timing advance command [11, TS 38.321], $T_A$, for a TAG indicates adjustment of a current $N_{TA}$ value, $N_{TA\_old}$, to the new $N_{TA}$ value, $N_{TA\_new}$, by index values of $T_A = 0, 1, 2, \ldots, 63$, where for a SCS of $2^\mu \cdot 15$ kHz, $N_{TA\_new} = N_{TA\_old} + (T_A - 31) \cdot 16 \cdot 64/2^\mu$.
$N_{TA,offset}$

| Frequency range and band of cell used for uplink transmission | $N_{TA\ offset}$ (Unit: $T_c$) |
|---|---|
| FR1 FDD band without LTE-NR coexistence case or FR1 TDD band without LTE-NR coexistence case | 25600 (Note 1) |
| FR1 FDD band with LTE-NR coexistence case | 0 (Note 1) |
| FR1 TDD band with LTE-NR coexistence case | 39936 (Note 1) |
| FR2 | 13792 |

$T_c = 0.509$ ns (Note 1):
The UE identifies $N_{TA\ offset}$ based on the information n-TimingAdvanceOffset as specified in TS 38.331 [2], If UE is not provided with the information n-TimingAdvanceOffset, the default value of $N_{TA\ offset}$ is set as 25600 for FR1 band. In case of multiple UL carriers in the same TAG, UE expects that the same value of n-TimingAdvanceOffset is provided for all the UL carriers according to clause 4.2 in TS 38.213 [3] and the value 39936 of $N_{TA\ offset}$ can also be provided for a FDD serving cell.
Note 2:
Void

2.2. PRS in LTE System

For such positioning, a positioning reference signal (PRS) may be used. The PRS is a reference signal used to estimate the position of the UE.

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

[Equation 1]

In Equation 1, n s denotes a slot number in a radio frame and l denotes an OFDM symbol number in a slot. $N_{RB}^{max,DL}$ is the largest of DL bandwidth configurations, expressed as $N_{SC}^{RB}$. $N_{SC}^{RB}$ denotes the size of an RB in the frequency domain, for example, 12 subcarriers.

c(i) denotes a pseudo-random sequence and may be initialized by Equation 2 below.

$$c_{init} = 2^{28} \cdot \lfloor N_{ID}^{PRS}/512 \rfloor 2^{10} \cdot 7 \cdot (n_s+1)+l+1) \cdot (2 \cdot (N_{ID}^{PRS} \bmod 512)+1)+2 \cdot (N_{ID}^{PRS} \bmod 512)+N_{CP}$$

[Equation 2]

Unless additionally configured by higher layers, $N_{ID}^{PRS}$ is equal to $N_{ID}^{cell}$, and $N_{CP}$ is 1 for a normal CP and 0 for an extended CP.

Figure 11:
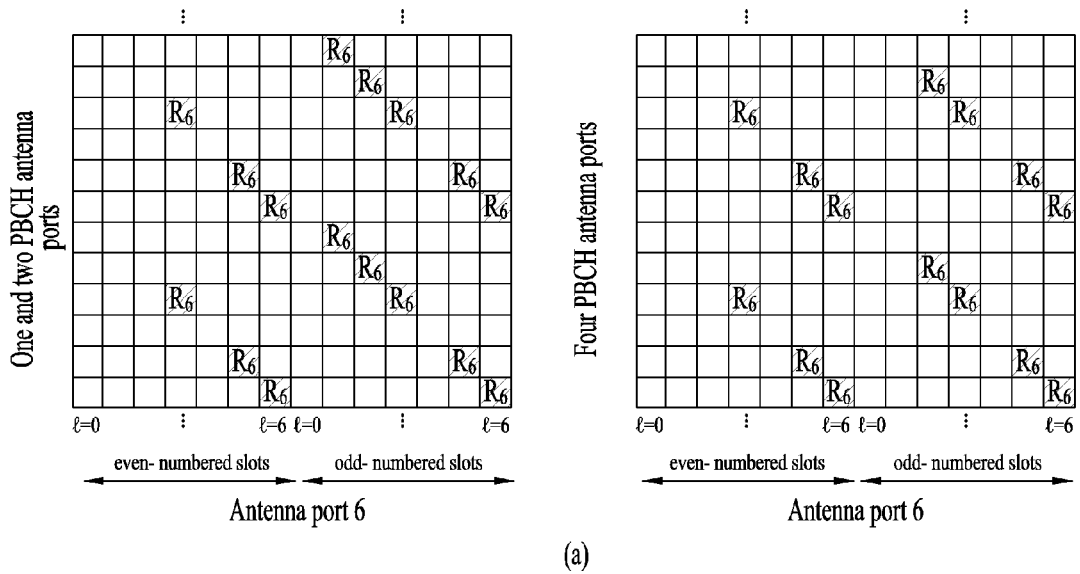
FIG. 11 illustrates exemplary mapping of a positioning reference signal (PRS) in a long term evolution (LTE) system to which various embodiments of the present disclosure are applicable.
Figure 11:
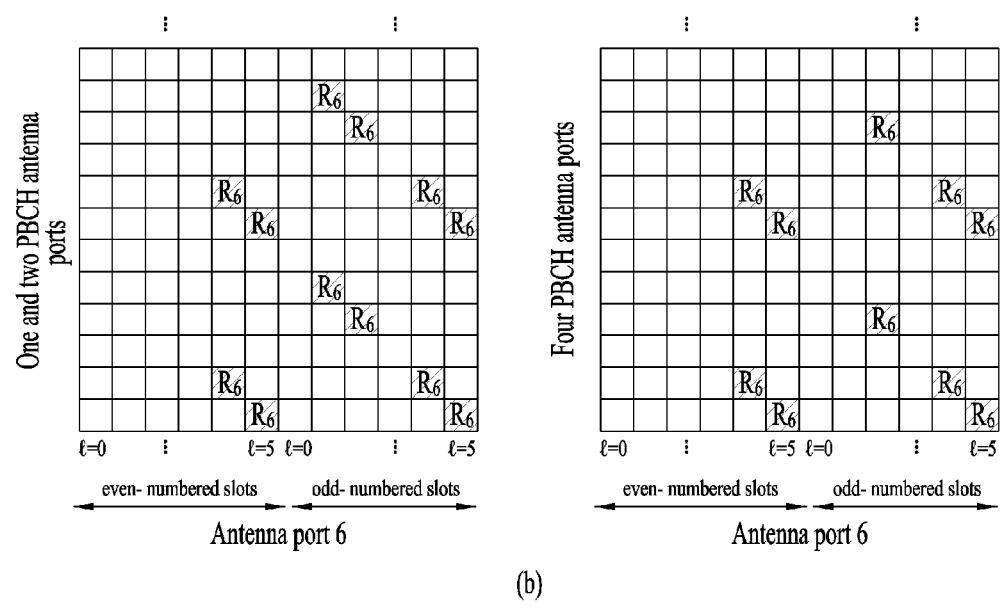

FIG. 11 illustrates an exemplary pattern to which a PRS is mapped in a subframe.

As illustrated in FIG. 11, the PRS may be transmitted through an antenna port 6. FIG. 11(a) illustrates mapping of the PRS in the normal CP and FIG. 11(b) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 10 below.

TABLE 10

| PRS configuration Index ($I_{PRS}$) | PRS periodicity (subframes) | PRS subframe offset (subframes) |
|---|---|---|
| 0–159 | 160 | $I_{PRS}$ |
| 160–479 | 320 | $I_{PRS}$-160 |
| 480–1119 | 640 | $I_{PRS}$-480 |
| 1120–2399 | 1280 | $I_{PRS}$-1120 |
| 2400–2404 | 5 | $I_{PRS}$-2400 |
| 2405–2414 | 10 | $I_{PRS}$-2405 |
| 2415–2434 | 20 | $I_{PRS}$-2415 |

TABLE 10-continued

| PRS configuration Index ($I_{PRS}$) | PRS periodicity (subframes) | PRS subframe offset (subframes) |
|---|---|---|
| 2435–2474 | 40 | $I_{PRS}$-2435 |
| 2475–2554 | 80 | $I_{PRS}$-2475 |
| 2555–4095 |  | Reserved |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

2.3. UE Positioning Architecture in NR System

Figure 12:
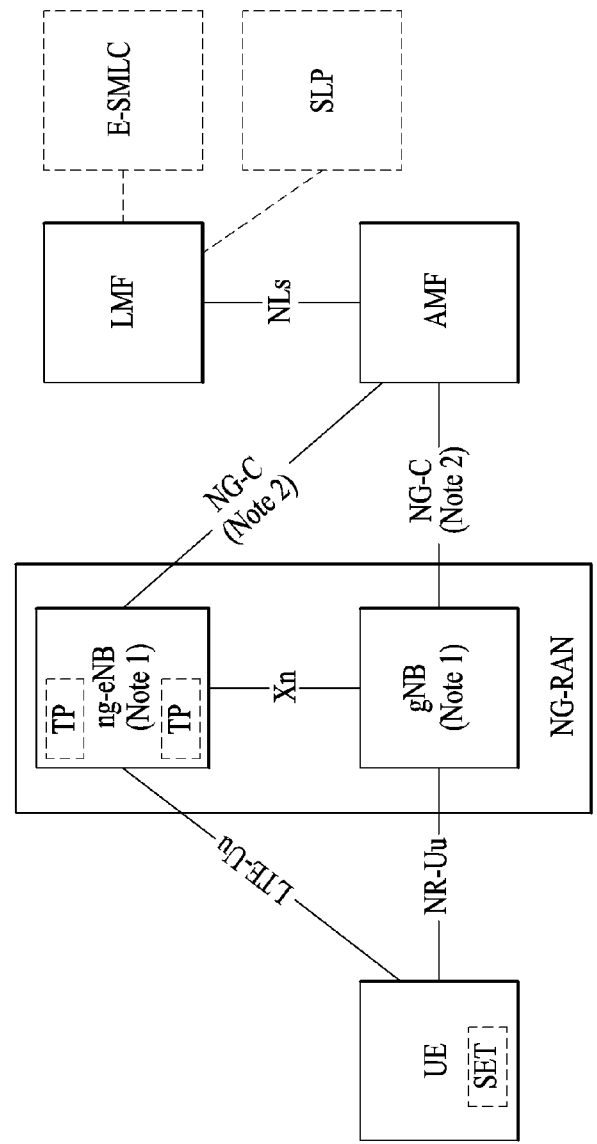
FIG. 12 is a diagram illustrating an example of an architecture of a system for positioning a UE, to which various embodiments of the present disclosure are applicable.

FIG. 12 illustrates architecture of a 5G system applicable to positioning of a UE connected to an NG-RAN or an E-UTRAN.

Referring to FIG. 12, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 13:
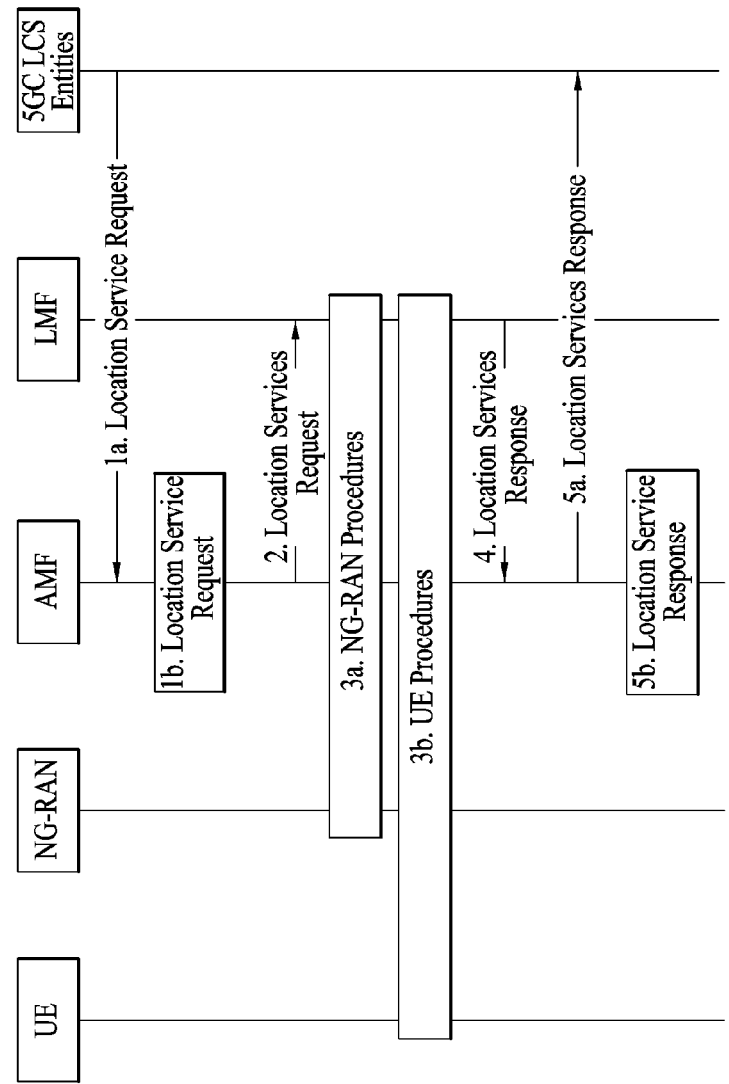
FIG. 13 is a diagram illustrating an example of a procedure of positioning a UE, to which various embodiments of the present disclosure are applicable.

FIG. 13 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 13. In other words, in FIG. 13 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1*a*, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1*b*. For example, the serving AMF may determine that itself will perform the location service in order to measure the position of the UE for an emergency call.

In step 2, the AMF transfers the request for the location service to an LMF. In step 3*a*, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3*a* may be an NRPPa protocol which will be described later.

Additionally, in step 3*b*, the LMF may initiate a location procedure for DL positioning together with the UE. For example, the LMF may transmit the location assistance data to the UE or obtain a location estimate or location measurement value. For example, in step 3*b*, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3*b* may be performed independently but may be performed consecutively. Generally, although step 3*b* is performed in order of the capability information transfer procedure, the location assistance data transfer procedure, and the location information transfer procedure, step 3*b* is not limited to such order. In other words, step 3*b* is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 13 has been initiated by step 1b, the AMF may use the location service response in order to provide a location service related to an emergency call.

2.5. Positioning Protocol 2.5.1. LTE Positioning Protocol (LPP)

Figure 14:
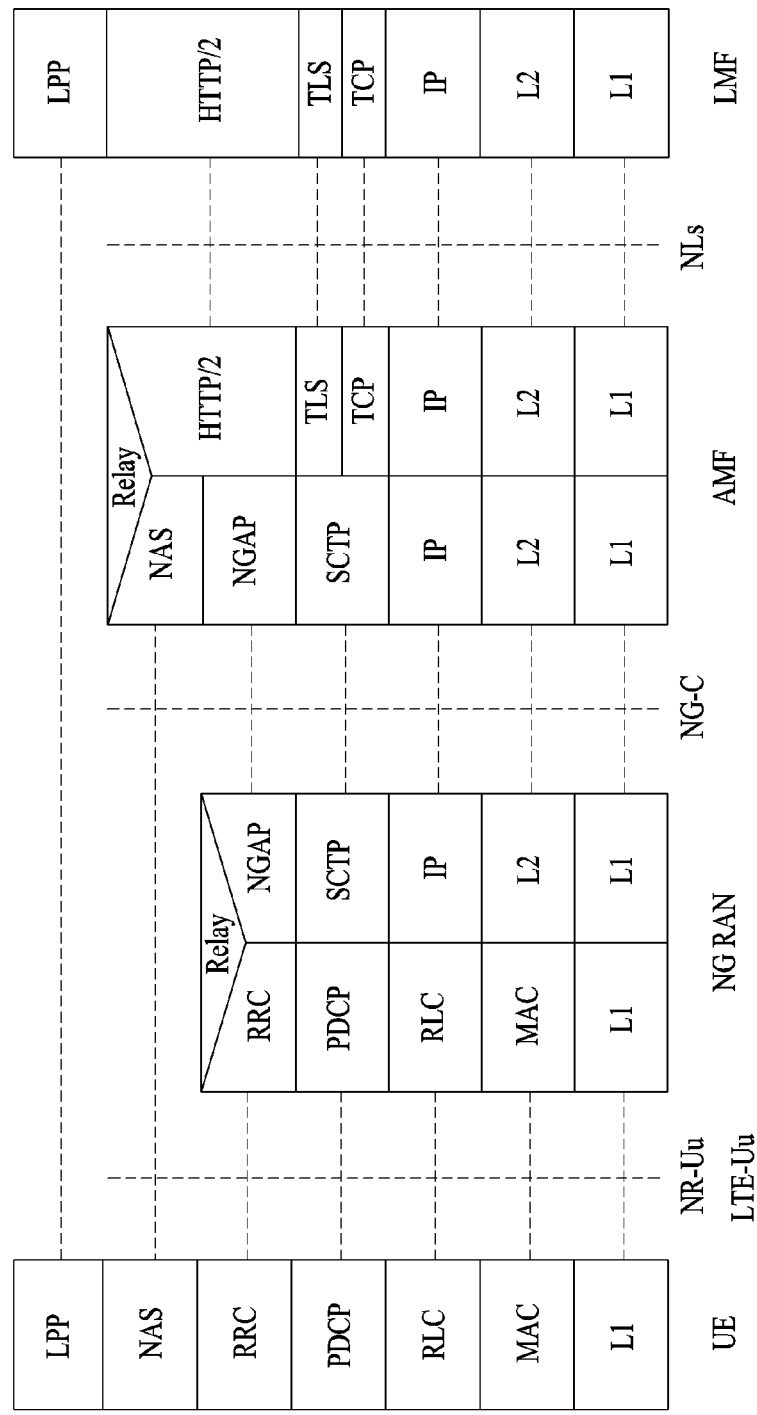
FIG. 14 is a diagram illustrating protocol layers for supporting LTE positioning protocol (LPP) message transmission, to which various embodiments are applicable.

FIG. 14 illustrates an exemplary protocol layer used to support LPP message transfer between an LMF and a UE. An LPP protocol data unit (PDU) may be carried in a NAS PDU between an AMF and the UE.

Referring to FIG. 14, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.5.2. NR Positioning Protocol A (NRPPa)

Figure 15:
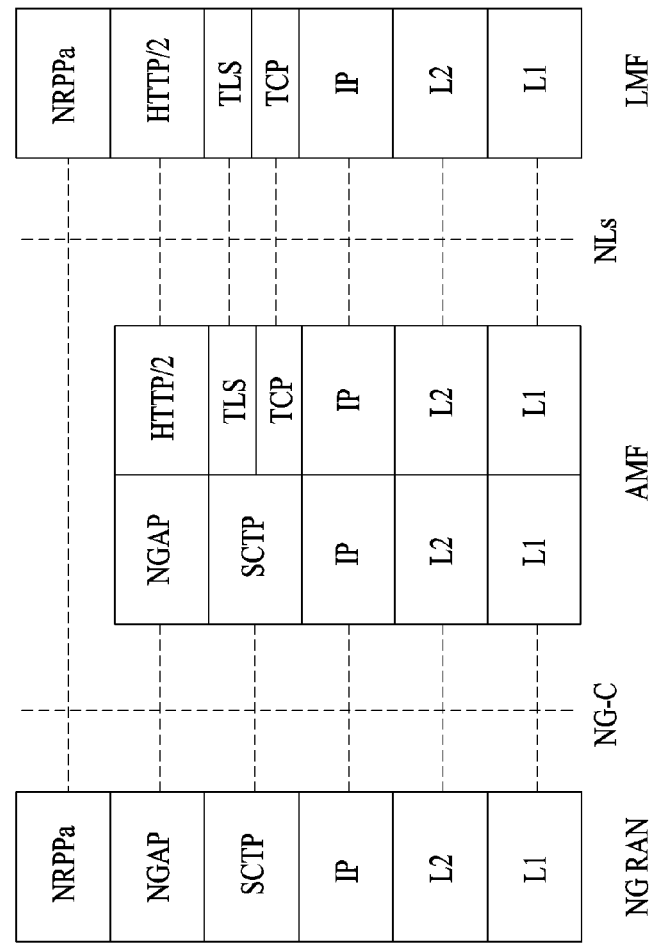
FIG. 15 is a diagram illustrating protocol layers for supporting NR positioning protocol A (NRPPa) protocol data unit (PDU) transmission, to which various embodiments are applicable.

FIG. 15 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.6.1. OTDOA (Observed Time Difference of Arrival)

Figure 16:
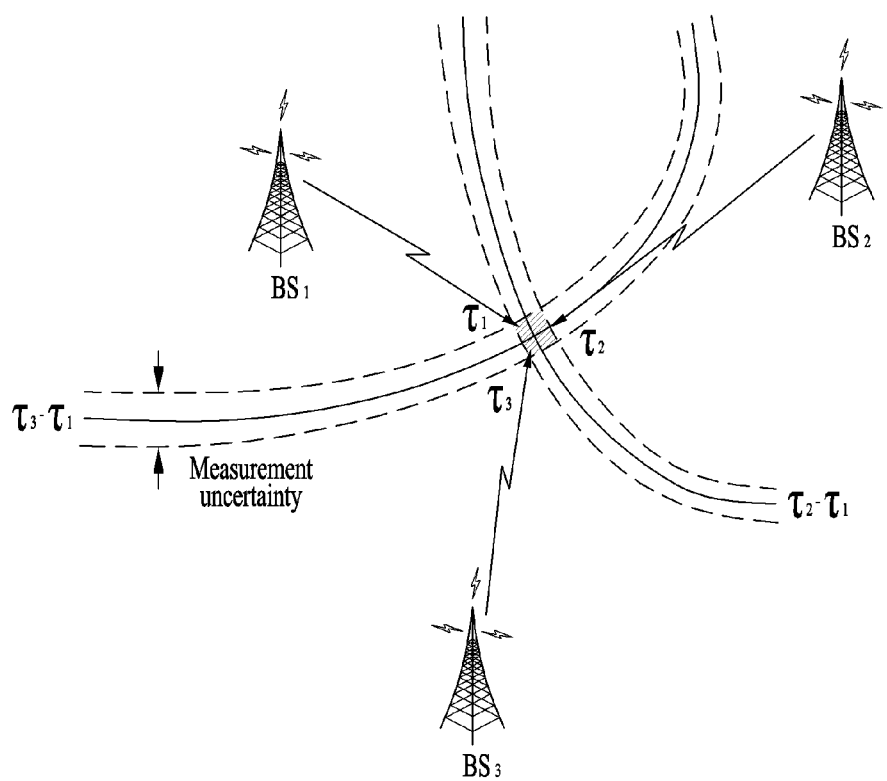
FIG. 16 is a diagram illustrating an observed time difference of arrival (OTDOA) positioning method, to which various embodiments are applicable.

FIG. 16 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \qquad \text{[Equation 3]}$$

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and ni and ni are UE ToA measurement error values.

2.6.2. E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.6.3. UTDOA (Uplink Time Difference of Arrival)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

2.6.4. Multi RTT (Multi-Cell RTT)

Compared to OTDOA positioning requiring fine synchronization (e.g., at the nano-second level) between TPs in the network, RTT positioning requires only coarse timing TRP (e.g., BS) synchronization although it is based on TOA measurements like OTDOA positioning.

Figure 17:
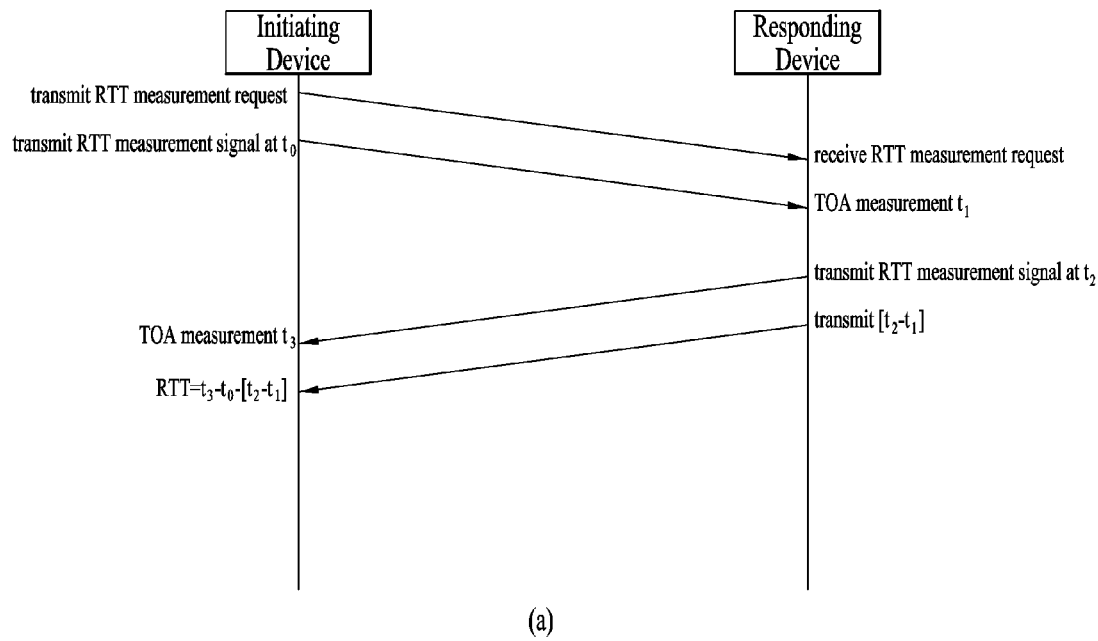
FIG. 17 is a diagram illustrating a multi-round trip time (multi-RTT) positioning method to which various embodiments are applicable.
Figure 17:
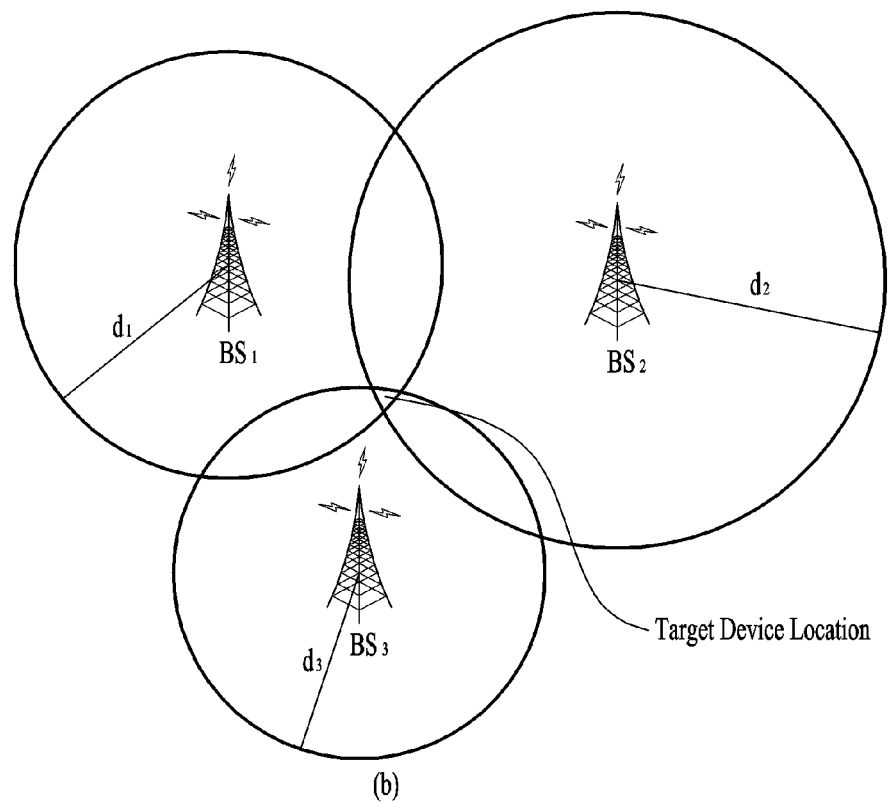

FIG. 17 is a diagram illustrating an exemplary multi-RTT positioning method to which various embodiments of the present disclosure are applicable.

Referring to FIG. 17(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 1701 according to an exemplary embodiment, the initiating device may transmit an RTT measurement request, and the responding device may receive the RTT measurement request.

In operation 1703 according to an exemplary embodiment, the initiating device may transmit an RTT measurement signal at time to, and the responding device may obtain TOA measurement $t_1$.

In operation 1705 according to an exemplary embodiment, the responding device may transmit an RTT measurement signal at time $t_2$, and the initiating device may obtain TOA measurement $t_3$.

In operation 1707 according to an exemplary embodiment, the responding device may transmit information about [$t_2$-$t_1$], and the initiating device may receive the corresponding information and calculate an RTT based on Equation 4 below. The corresponding information may be transmitted and received by a separate signal or in the RTT measurement signal of operation 1705.

$$RTT = t_3 - t_0 - [t_2 - t_1] \quad \text{[Equation 4]}$$

Referring to FIG. 17(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

3. Various Embodiments of the Present Disclosure

Various embodiments of the present disclosure will be described below in detail based on the above-described technical idea. Clause 1 and clause 2 may be applied to the various embodiments of the present disclosure. For example, operations, functions, and terms which are not defined in the various embodiments of the present disclosure may be performed and described based on clause 1 and clause 2.

Symbol/abbreviations/terms used in the following description of various embodiments of the present disclosure are described below.

CSI-RS: channel state information reference signal

CP: cyclic prefix

LMF: location management function

PRS: positioning reference signal

PRS block: A PRS block may include PRS resources and/or PRS resource sets transmitted from a specific TP/BS and/or a plurality of TPs/BSs on a specific TX beam. The PRS block may mean a transmission unit for transmitting a PRS over one or more symbols.

PRS occasion: A PRS occasion may be defined/configured as a group of one or more PRS blocks and/or a group of one or more slots in which a PRS is transmitted.

RE: resource element

RS: reference signal

TRP: transmission reception point (TP: transmission point)

$\lfloor x \rfloor$: This denotes floor (x), and more particularly, a floor operation or floor number of x. It may mean the maximum integer less than or equal to a real number x.

Unless otherwise specified, factors/variables/parameters denoted by the same characters in the following description of various embodiments of the present disclosure may be understood as factors/variables/parameters with the same definition.

As many communication devices require higher communication traffic as time flows, a next-generation fifth-generation (5G) system, which is a wireless broadband communication system enhanced over the LTE system, is required. This next-generation 5G system is called new RAT (NR) for convenience.

Unlike LTE, NR may support multiple numerologies to support various services. For example, NR may support various subcarrier spacings (SCSs). Considering the difference between LTE and NR, a new reference signal (RS) generation method may be required in NR.

Various embodiments of the present disclosure may relate to a method and apparatus for (scrambling) sequence initialization of an RS for wireless communication.

For example, various embodiments of the present disclosure may relate to a method and apparatus for initializing a sequence so that a specific TP that transmits an RS is capable of being identified, unlike methods used in LTE.

For example, various embodiments of the present disclosure may relate to a method and apparatus for PRS sequence initialization.

Figure 18:
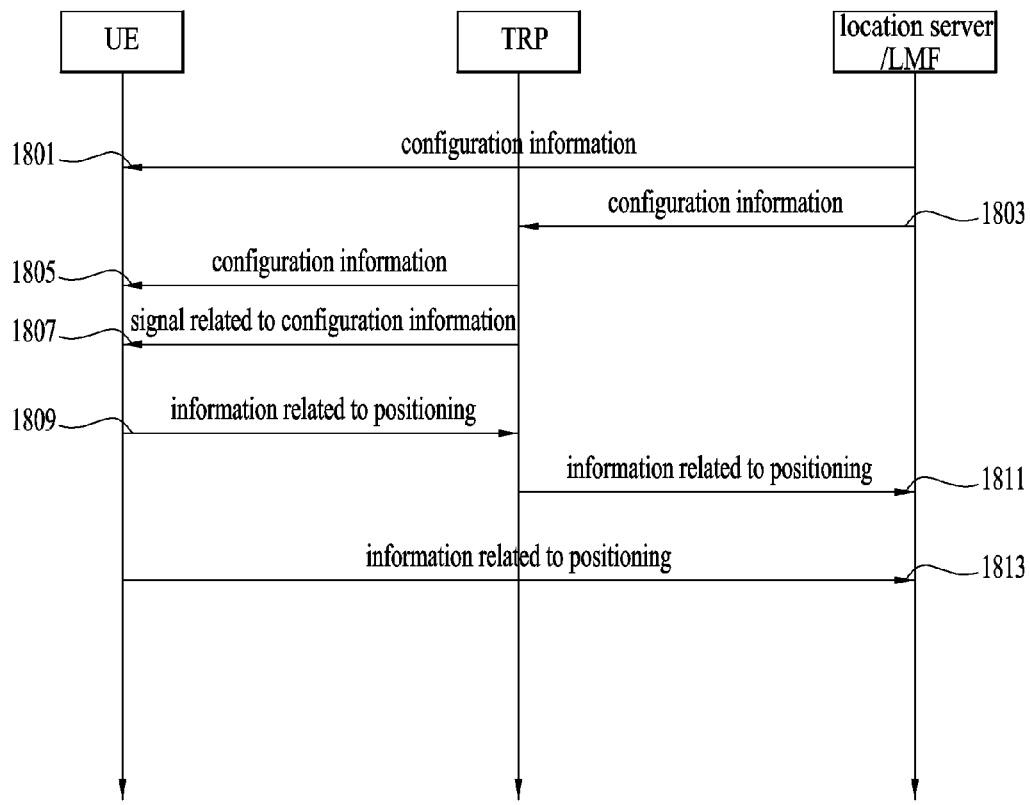
FIG. 18 is a simplified diagram illustrating a method of operating a UE, a transmission and reception point (TRP), a location server, and/or a location management function (LMF) according to various embodiments.

FIG. 18 is a simplified diagram illustrating a method of operating a UE, a TRP, a location server, and/or an LMF according to various embodiments of the present disclosure.

Referring to FIG. 18, the location server and/or the LMF may transmit configuration information to the UE, and the UE may receive the configuration information, in operation 1801 according to an exemplary embodiment.

In operation 1803 according to an exemplary embodiment, the location server and/or the LMF may transmit reference configuration information to the TRP, and the TRP may receive the reference configuration information. In operation 1805 according to an exemplary embodiment, the TRP may transmit the reference configuration information to the UE, and the UE may receive the reference configuration information. In this case, operation 1801 according to an exemplary embodiment may be skipped.

On the contrary, operations 1803 and 1805 according to an exemplary embodiment may be skipped. In this case, operation 2601 according to an exemplary embodiment may be performed.

That is, operation 1801 according to an exemplary embodiment, and operations 1803 and 1805 according to an exemplary embodiment may be optional.

In operation 1807 according to an exemplary embodiment, the TRP may transmit a signal related to the configuration information, and the UE may receive the signal. For example, the signal related to the configuration information may be a signal for positioning the UE.

In operation 1809 according to an exemplary embodiment, the UE may transmit a positioning-related signal to the TRP, and the TRP may receive the positioning-related signal. In operation 1811 according to an exemplary embodiment, the TRP may transmit the positioning-related signal to the location server and/or the LMF, and the location server and/or the LMF may receive the positioning-related signal.

In operation 1813 according to an exemplary embodiment, the UE may transmit the positioning-related signal to the location server and/or the LMF, and the location server and/or the LMF may receive the positioning-related signal. In this case, operations 1809 and 1811 according to an exemplary embodiment may be skipped.

On the contrary, operation 1813 may be skipped. In this case, operations 2609 and 2611 according to an exemplary embodiment may be performed.

That is, operations 1809 and 1811 according to an exemplary embodiment, and operation 1813 according to an exemplary embodiment may be optional.

In an exemplary embodiment, the positioning-related signal may be obtained based on the configuration information and/or the signal related to the configuration information.

Figure 19:
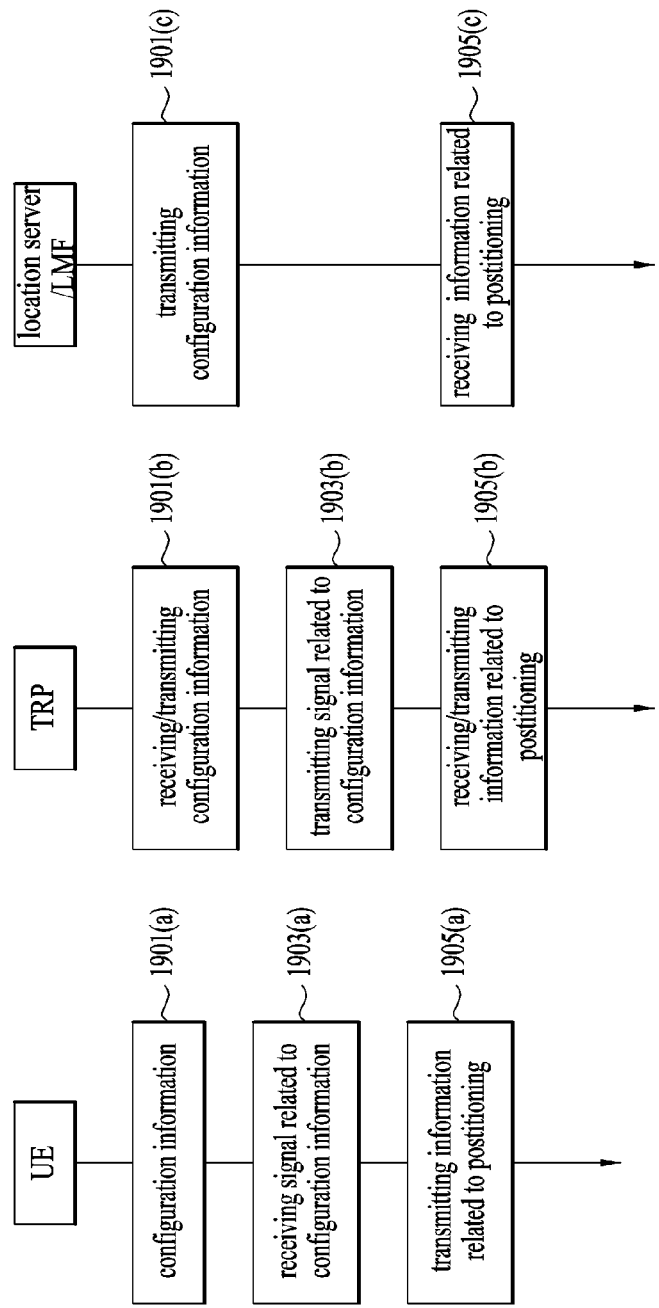
FIG. 19 is a simplified diagram illustrating a method of operating a UE, a TRP, a location server, and/or an LMF according to various embodiments.

FIG. 19 is a simplified diagram illustrating a method of operating a UE, a TRP, a location server, and/or an LMF according to various embodiments of the present disclosure.

Referring to FIG. 19(*a*), the UE may receive configuration information in operation 1901(*a*) according to an exemplary embodiment.

In operation 1903(*a*) according to an exemplary embodiment, the UE may receive a signal related to the configuration information.

In operation 1905(*a*) according to an exemplary embodiment, the UE may transmit positioning-related information.

Referring to FIG. 19(*b*), the TRP may receive the configuration information from the location server and/or the LMF and transmit the received configuration information to the UE in operation 1901(*b*) according to an exemplary embodiment.

In operation 1903(*b*) according to an exemplary embodiment, the TRP may transmit a signal related to the configuration information.

In operation 1905(*b*) according to an exemplary embodiment, the TRP may receive the positioning-related information and transmit the received positioning-related information to the location server and/or the LMF.

Referring to FIG. 19(*c*), the location server and/or the LMF may transmit the configuration information in operation 1901(*c*) according to an exemplary embodiment.

In operation 1905(*c*) according to an exemplary embodiment, the location server and/or the LMF may receive the positioning-related information.

For example, the configuration information may be understood as related to reference configuration (information) and one or more pieces of information transmitted/configured to/for the UE by the location server and/or the LMF and/or the TRP, and/or understood as the reference configuration (information) and the one or more pieces of information transmitted/configured to/for the UE by the location server and/or the LMF and/or the TRP in the following description of various embodiments of the present disclosure.

For example, the positioning-related signal may be understood as a signal related to one or more pieces of information reported by the UE and/or as a signal including the one or more pieces of information reported by the UE in the following description of various embodiments of the present disclosure.

For example, a BS, a gNB, a cell, and so on may be replaced by a TRP, a TP, or any other device that plays the same role in the following description of various embodiments of the present disclosure.

For example, the location server may be replaced by the LMF or any other device playing the same role in the following description of various embodiments of the present disclosure.

More specific operations, functions, terms, and so on in an operation according to each exemplary embodiment may be performed and descried based on various embodiments of the present disclosure described below. Operations according to each exemplary embodiment are exemplary, and one or more of the above operations may be omitted according to the specific contents of each embodiment.

Various embodiments of the present disclosure will be described below in detail. Unless contradicting each other, the various embodiments of the present disclosure described below may be fully or partially combined to constitute other various embodiments of the present disclosure, which will be clearly understood to those skilled in the art.

3.1. Sequence Configuration for RS

According to various embodiments of the present disclosure, sequence configurations for an RS may be provided. For example, the RS may be a downlink reference signal (DRS). Alternatively, the RS may be a PRS.

A DL PRS resource set may be defined as a set of DL PRS resources. Each DL PRS resource may have a DL PRS resource identifier (ID).

DL PRS resources included in the DL PRS resource set may be associated with the same TRP.

A TRP may transmit one or more beams. A DL PRS resource ID included in the DL PRS resource set may be associated with one beam transmitted from a single TRP.

The above-described examples may be independent of whether the TRP and beam related to signal transmission are known to a UE.

A DL PRS sequence may be obtained/generated by a Gold sequence generator.

A general pseudo-random sequence may be defined as a length-31 Gold sequence. For example, a length-$M_{PN}$ output sequence c(n) (n=0, 1, ..., $M_{PN}$−1) may be defined as in Equation 5.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 5]}$$

For example, $N_c$=1600, and a first m-sequence 28(n) may be initialized as follows: 28(0)=1 and 28(n)=0 (n=1, 2, ..., 30). Initialization of a second m-sequence $x_2(n)$ may be expressed by $c_{init}=\sum_{i=0}^{30} x_2(i) \cdot 2^i$, which has values that depend on sequence application.

The value of $c_{init}$ for initialization of a DL PRS sequence generator may be provided according to one or more of various embodiments of the present disclosure.

Quadrature phase shift keying (QPSK) modulation may be used for a DL PRS signal transmitted based on cyclic prefix-orthogonal frequency division multiplexing (CP-OFDM). A different method may be applied to a DL PRS sequence generated by a different mechanism.

A specific TP/BS may transmit an RS (e.g., PRS) on one or two or more TX beams for UE positioning (in the description of various embodiments of the present disclosure, the RS may be understood as the PRS, but the present disclosure is not limited thereto).

RSs transmitted on each TX beam may be configured/indicated with different RS resources so that the RSs may be identified by the UE.

For example, frequency division multiplexing (FDM), code division multiplexing (CDM), time division multiplexing (TDM), and/or spatial division multiplexing (SDM) may be applied to different RS resources.

One or more RS resources may be included in one RS resource set. Multiple RS resources included in the same RS resource set may be transmitted by the same TP/BS. In addition, the UE may assume/recognize that multiple RS resources included in the same RS resource set are transmitted by the same TP/BS.

A specific RS resource may not be included only in a specific RS resource set but may be included in two or more RS resource sets. This is because if only dedicated RS resources are allocated to each RS resource set, radio resources such as time and/or frequency resources for RS transmission may be wasted.

For example, it is assumed that a specific TP/BS transmits RS resource #1 configured for UE positioning to a target UE, UE #1 in a specific time-frequency RE. According to this assumption, another specific TP/BS that is quite geographically distant (e.g., more than a prescribed distance) from the corresponding specific TP/BS may be capable of transmitting an RS for UE positioning to a target UE, UE #2 on RS resource #1. If an independent RS (e.g., PRS) resource is allocated to each TP/BS, this may cause a significant waste of radio resources such as time and frequency resources.

Figure 20:
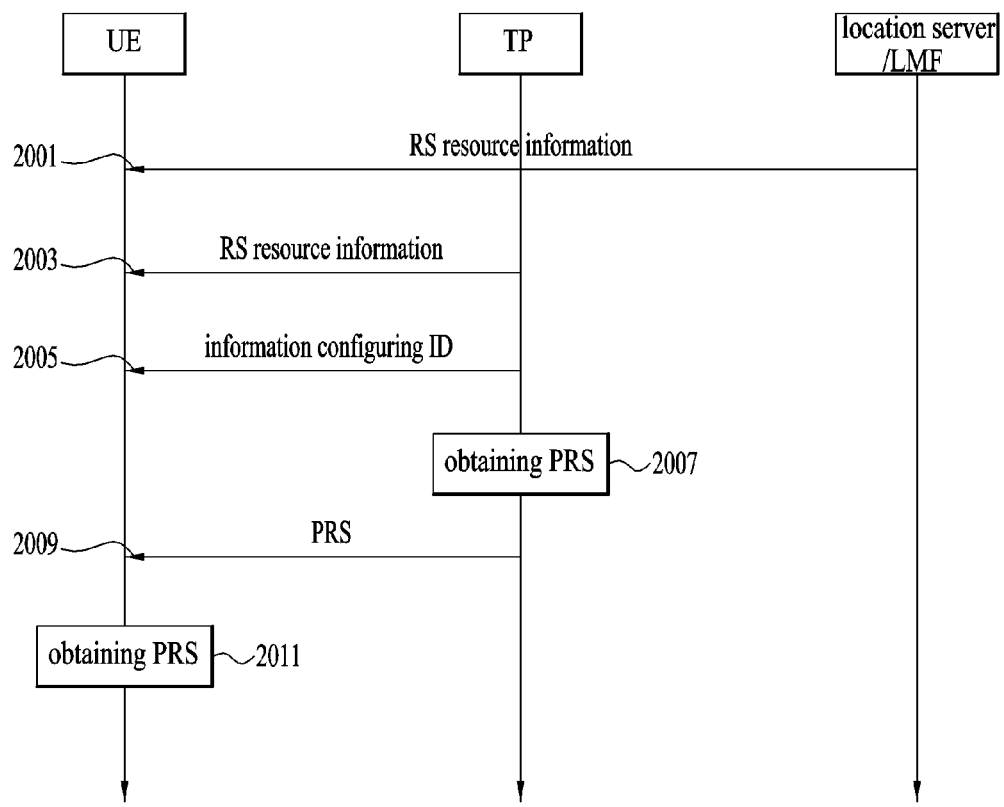
FIG. 20 is a diagram schematically illustrating an operating method for a UE and/or a network node according to various embodiments of the present disclosure.

FIG. 20 is a diagram schematically illustrating an operating method for a UE and/or a network node according to various embodiments of the present disclosure.

Referring to FIG. 20, in operation 2001 according to an exemplary embodiment, a location server and/or an LMF may transmit RS resource information to the UE, and the UE may receive the RS resource information.

In operation 2003 according to an exemplary embodiment, the location server and/or LMF may transmit RS resource information to a TP, and the TP may receive the RS resource information.

In operation 2005 according to an exemplary embodiment, the TP may forward the RS resource information to the UE, and the UE may receive the RS resource information. In this case, operation 2001 according to the exemplary embodiment may be omitted.

On the contrary, operations 2003 and 2005 according to the exemplary embodiments may be omitted. In this case, operation 2001 according to the exemplary embodiment may be performed.

That is, operation 2001 according to the exemplary embodiment and operations 2003 and 2005 according to the exemplary embodiments may be optional.

Herein, an RS resource may mean the resource for a RS used for UE positioning.

In operation 2007 according to an exemplary embodiment, the location server and/or LMF may transmit information for configuring an ID to the UE, and the UE may receive the information. For example, the ID may be an ID to be used for sequence initialization of each PRS resource and/or each PRS resource set. Alternatively, the ID may be a scrambling sequence ID.

In operation 2009 according to an exemplary embodiment, the location server and/or LMF may transmit information for configuring an ID to the TP, and the TP may receive the information. In this case, operation 2007 according to the exemplary embodiment may be omitted.

In operation 2011 according to an exemplary embodiment, the TP may forward the information for configuring the ID to the UE, and the UE may receive the information. For example, the ID may be an ID to be used for sequence initialization of each PRS resource and/or each PRS resource set. Alternatively, the ID may be a scrambling sequence ID. In this case, operation 2007 according to the exemplary embodiment may be omitted.

On the contrary, operations 2009 and 2011 according to the exemplary embodiments may be omitted. In this case, operation 2007 according to the exemplary embodiment may be performed.

That is, operation 2007 according to the exemplary embodiment and operations 2009 and 2011 according to the exemplary embodiments may be optional.

In operation 2013 according to an exemplary embodiment, the TP may generate/obtain a PRS. Specifically, the TP may generate/obtain the PRS by performing the sequence initialization according to a slot index, an OFDM symbol index within a slot, a PRS resource on which the PRS is transmitted, and/or a scrambling sequence ID configured in a PRS resource set.

In operation 2015 according to an exemplary embodiment, the TP may transmit the PRS (PRS resource and/or PRS resource set) to the UE, and the UE may receive the PRS.

In operation 2017 according to an exemplary embodiment, the UE may obtain/receive the PRS (PRS resource and/or PRS resource set). Specifically, the UE may find a sequence initialization value based on the slot index, the OFDM symbol index within the slot, the PRS resource on which the PRS is received, and/or the scrambling sequence ID configured in the PRS resource set. Then, the UE may obtain/receive the PRS (PRS resource and/or PRS resource set) by acquiring (deriving) a sequence used for the received PRS resource.

More specific operations, functions, terms, etc. in the operation according to each exemplary embodiment may be performed and explained in various embodiments of the present disclosure, which will be described later. The operations according to the individual exemplary embodiments is merely exemplary, and one or more of the above-described operations may be omitted depending on the details of each embodiment.

3.1.1. [Proposal #1] Sequence Initialization Method 1

When a specific RS (e.g., PRS) resource configured to measure the location of a UE is included in different RS (e.g., PRS) resource sets, the UE may need to obtain measurements by identifying specific (same) RS (e.g., PRS) resources transmitted from different specific TPs/BSs. To this end, a method of initializing an RS sequence based on an RS (e.g., PRS) resource set ID and/or an ID configured/indicated for each RS resource set (e.g., a scrambling ID for each RS resource set) other than the RS resource set ID may be considered. That is, a BS may configure/indicate to the UE an RS resource set ID (e.g., RS resource set index) and an additional ID (e.g., scrambling sequence ID) for each RS (e.g., PRS) resource set as well as each RS (e.g., PRS) resource.

In consideration of the above, the BS and/or UE may perform sequence initialization as in Equation (0).

$$c_{init} = f(N^{RS}_{ID}, N^{RSSet}_{ID}, n_s, l) \quad \text{[Equation (0)]}$$

In Equation (0), f(a, b, c, ...) may mean a function having a, b, c, etc. as factors and/or variables.

- $c_{init}$: denotes a sequence initialization value for sequence initialization. For example, $c_{init}$ may be a Gold sequence initialization value. However, sequence initialization methods according to various embodiments of the present disclosure may be applied not only to initialization of a Gold sequence but also to initialization of other sequences. In this case, $c_{init}$ may mean other sequence initialization values.
- $N^{RS}_{ID} \in \{0, 1, \ldots, 2^X-1\}$ and/or $N^{RS}_{ID} \in \{0, 1, \ldots, 2^M-1\}$: denotes a specific RS (e.g., PRS) sequence ID, a scrambling ID and/or resource ID of a specific RS (e.g., PRS) resource, and/or an ID representing a resource, which is configured/indicated for each resource. For example, $N^{RS}_{ID}$ may be represented/configured/indicated with X (>0) bits and/or M (>0) bits.
- $N^{RSSet}_{ID} \in \{0, 1, \ldots, 2^Y-1\}$ and/or $N^{RSSet}_{ID} \in \{0, 1, \ldots, 2^L-1\}$: denotes a scrambling ID configured for each specific RS (e.g., PRS) resource set, a resource set ID, and/or an ID representing a resource set. For example, $N^{RSSet}_{ID}$ may be represented/configured/indicated with Y (>0) bits and/or L (>0) bits.
- $n_s \in \{0, 1, 2, \ldots\}$: denotes a slot index and/or a slot number. $n_s \in \{0, 1, 2, \ldots\}$ may be a slot index and/or a slot number in a frame. In NR, considering that the number of slots/symbols included in a frame may vary depending on SCSs, the maximum value of $n_s$ may vary depending on SCS numerologies of NR.
- $l \in \{0, 1, 2 \ldots 13\}$: denotes an OFDM symbol index within a slot.

As a more specific example, $c^{init}$ of Equation (0) for sequence initialization may be defined as in Equation (1). That is, a sequence initialization method based on Equation (1) may be considered.

$$c_{init} = (2^{M+L} \times ((K \times n_s + l + 1)(2N^{RS}_{ID} + 1)) + g(N^{RS}_{ID}, N^{RSSet}_{ID})) \bmod 2^N \quad \text{[Equation (1)]}$$

- N: is 1 or a natural number greater than 1. N may denote the length of a Gold sequence. For example, in the case of a length-31 Gold sequence, N may be 31. However, sequence initialization methods according to various embodiments of the present disclosure may be applied not only to initialization of a Gold sequence but also to initialization of other sequences. In this case, N may mean the lengths of other sequences.
- M: is 1 or a natural number greater than 1. M may be defined as a fixed value. M may be related to the bit size of $N^{RS}_{ID}$. The bit size (e.g., 12 bits) of $N^{RS}_{ID}$ ($n^{PRS}_{ID,seq}$) for a PRS may be larger than the bit size (e.g., 10 bits) of $N^{RS}_{ID}(n_{ID})$ for a CSI-RS. M may be determined in consideration of the difference between the bit size of $n^{PRS}_{ID,seq}$ and the bit size of $n_{ID}$. For example, M may be 19, but the present disclosure is not limited thereto.
- K: is 1 or a natural number greater than 1. K may be defined as a fixed value. K may be related to the number of symbols per slot. For example, considering that one slot consists of 14 symbols (in the case of a normal CP), K may be defined as K=14. Alternatively, considering that one slot consists of 12 symbols (in the case of an extended CP), K may be defined as K=12. If sequence initialization is performed on a PRS block basis and/or on a PRS occasion basis, the K value may be defined/configured as the number of symbols included in one PRS block and/or PRS occasion.
- $g(N^{RS}_{ID}, N^{RSSet}_{ID})$: denotes a function of $N^{RS}_{ID}$ and $N^{RSSet}_{ID}$. $g(N^{RS}_{ID}, N^{RSSet}_{ID})$ may mean a function having $N^{RS}_{ID}$ and $N^{RSSet}_{ID}$ as factors and/or variables.

As a more specific example, $g(N^{RS}_{ID}, N^{RSSet}_{ID})$ may be defined as in Equation (1-1) and/or Equation (1-2).

$$g(N^{RS}_{ID}, N^{RSSet}_{ID}) = 2^L \times N^{RS}_{ID} + N^{RSSet}_{ID} + c_1 \quad \text{[Equation (1-1)]}$$

$$g(N^{RS}_{ID}, N^{RSSet}_{ID}) = 2^M \times N^{RSSet}_{ID} + N^{RSSet}_{ID} + c_2 \quad \text{[Equation (1-2)]}$$

$c_1$ and/or $c_2$ may be a real number greater than or equal to 0.

Equation (1-1) and Equation (1-2) are similar methods. However, since Equation (1-2) has a significant difference between the values of $c_{init}$ depending on the value of $N^{RSSet}_{ID}$ compared to Equation (1-1), the difference between sequence initialization values increases for the same value of $N^{RS}_{ID}$. Equation (1-2) has an advantage of better identifying the same PRS resource transmitted from different TPs. Equations (1-1) and (1-2) are exemplary, and $g(N^{RS}_{ID}, N^{RSSet}_{ID})$ may be defined in other forms according to various embodiments of the present disclosure. That is, similar modifications and/or applications may also be included in various embodiments of the present disclosure.

mod: denotes a modulo arithmetic or operation. The modular operation may be an operation to obtain a remainder r obtained by dividing a dividend q by a divisor d (r=q mod(d)).

In another method, it may be considered that an ID configured separately for each resource set (e.g., a scrambling ID for an RS resource set) and/or an ID representing a resource set is multiplied by $(14n_s+l+1)$. A form such as Equation (2) may be considered.

$$c_{init}=(2^{M+L}\times((Kn_s+l+1)(2N^{RSSet}_{ID}+1))+g(N^{RS}_{ID}, N^{RSSet}_{ID}))\bmod 2^N \quad \text{[Equation (2)]}$$

According to the method of Equation (2), the difference between the values of $c_{init}$ for different RS resource sets for a specific RS resource may increase compared to the method of Equation (1).

That is, the above-described method may mean that a RS resource set ID is available for sequence initialization. Additionally/alternatively, although a scrambling sequence ID is configured at the RS resource level, an ID represented/configured with L bits such as an independent scrambling sequence is configured for an RS resource set so that Gold sequence initialization may be performed at the resource level and/or at the resource set level.

The scrambling ID and/or ID of a RS resource set may be configured/indicated to the UE by being linked to a specific TP/BS ID and/or another ID capable of representing a specific TP/BS.

In Equations (1), (1-1), (1-2), and (2), $N^{RSSet}_{ID}$ may be an additional ID (e.g., a scrambling sequence ID) configured for a specific RS resource rather than an ID (e.g., scrambling sequence ID) defined by at the RS resource set level.

In Equations (1), (1-1), (1-2), and (2), $N^{RSSet}_{ID}$ may be a specific TP/BS ID (and/or an ID capable of representing the corresponding TP/BS) rather than an ID (e.g., scrambling sequence ID) defined by at the RS resource set level. When a specific RS resource is included and transmitted in different RS resource sets, it may be interpreted to mean that the same RS resource is transmitted from different TPs. $c_{init}$ in Equation (0) may be changed as follows: $c_{init}=f(N^{RS}_{ID}, N^{TP}_{ID}, n_s, l)$, where $N^{TP}_{ID}$ denotes a TP ID. That is, a sequence initialization value may be determined based on a PRS resource ID, a scrambling sequence ID of a PRS resource, a TP ID, a slot index, and/or a symbol index.

When TP/BS information (e.g., TP/BS ID) is used for sequence initialization, an LMF and/or location server may transmit/indicate information on a reference cell (and/or reference TP) and/or a neighboring cell (and/or neighboring TP) configured/indicated for a UE to a wireless network BS.

According to the method of Equation (1), the amount of change in the overall value due to an increase in the value of $N^{RS}_{ID}$ may be greater than the amount of change in the overall value due to an increase in the value of $N^{RSSet}_{ID}$.

On the other hand, according to the method of Equation (2), the amount of change in the overall value due to an increase in the value of $N^{RSSet}_{ID}$ may be greater than the amount of change in the overall value due to an increase in the value of $N^{RS}_{ID}$.

If the amount of change in the overall value increases although anyone of the values of $N^{RS}_{ID}$ and $N^{RSSet}_{ID}$ varies, there may be an advantage of lowering correlation due to use of different sequences. Based on this fact, the method of Equation (2-1) may be considered.

$$c_{init}=(2^P\times((Kn_s+l+1)(2N^{RS}_{ID}+1)(2N^{RSSet}_{ID}+1))+g(N^{RS}_{ID}, N^{RSSet}_{ID}))\bmod 2^N \quad \text{[Equation (2-1)]}$$

$N^{RS}_{ID} \in \{0, 1, \ldots, 2^x-1\}$ and/or $N^{RSSet}_{ID} \in \{0, 1, \ldots, 2^M-1\}$: denotes a specific RS (e.g., PRS) sequence ID, a scrambling ID and/or resource ID of a specific RS (e.g., PRS) resource, and/or an $N^{RS}_{ID}$ representing a resource, which is configured/indicated for each resource. For example, $N^{RS}_{ID}$ may be represented/configured/indicated with X (>0) bits and/or M (>0) bits.

$N^{RSSet}_{ID} \in \{0, 1, \ldots, 2^y-1\}$ and/or $N^{RSSet}_{ID} \in \{0, 1, \ldots, 2^L-1\}$: denotes a scrambling ID configured for each specific RS (e.g., PRS) resource set, a resource set ID, and/or an ID representing a resource set. For example, $N^{RSSet}_{ID}$ may be represented/configured/indicated with Y (>0) bits and/or L (>0) bits.

P: is 1 or a natural number greater than 1. When $N^{RS}_{ID}$ has a bit size of M bits and $N^{RSSet}_{ID}$ has a bit size of L bits, P≤M+L may be satisfied. When P≤M+L is satisfied, $N^{RS}_{ID}$ and $N^{RSSet}_{ID}$ may be configured/indicated with M and L bits, respectively, but this may mean that among all combinations of (sequence) IDs at the resource level and (sequence) IDs at the resource set level, only a total of P bits may be configured/indicated to be used, instead of using all of the combinations.

K: is 1 or a natural number greater than 1. K may be defined as a fixed value. K may be related to the number of symbols per slot. For example, considering that one slot consists of 14 symbols (in the case of a normal CP), K may be defined as K=14. Alternatively, considering that one slot consists of 12 symbols (in the case of an extended CP), K may be defined as K=12. If sequence initialization is performed on a PRS block basis and/or on a PRS occasion basis, the K value may be defined/configured as the number of symbols included in one PRS block and/or PRS occasion.

$n_s \in \{0, 1, 2, \ldots\}$: denotes a slot index and/or a slot number. $n_s \in \{0, 1, 2, \ldots\}$ may be a slot index and/or a slot number in a frame. In NR, considering that the number of slots/symbols included in a frame may vary depending on SCSs, the maximum value of $n_s$ may vary depending on SCS numerologies of NR.

$l \in \{0, 1, 2, \ldots 13\}$: denotes an OFDM symbol index within a slot.

$g(N^{RSSet}_{ID}, N^{RSSet}_{ID})$: denotes a function of $N^{RS}_{ID}$ and $N^{RSSet}_{ID}$. $g(N^{RS}_{ID}, N^{RSSet}_{ID})$ may mean a function having $N^{RS}_{ID}$ and $N^{RSSet}_{ID}$ as factors and/or variables.

The purpose of the above-described sequence initialization method is to allow a UE to recognize in which PRS resource set a specific PRS resource is transmitted and use different sequences (for different PRS resource sets) by considering that the specific PRS resource may be included in one or more PRS resource sets.

Since all PRS resources are not configured to be included in multiple PRS resource sets, M+L bits may not be necessary unless all PRS resources are included in different PRS resource sets. In addition, due to the (gold) sequence length, the value after the modular operation in the above-described equation may not be a unique value depending on the symbol index and the slot index. That is, since the sequence initialization values may be the same depending on the symbol index and the slot index, it may be necessary to appropriately determine the length of the (gold) sequence according to the value of P to avoid the above-described issue.

3.1.2. [Proposal #2] Sequence Initialization Method 2

According to various embodiments of the present disclosure, a method based on Equation (3) may be provided as another example of PRS sequence initialization.

$$c_{init} = \left(2^{N-(M-10)}\left\lfloor\frac{N_{ID}^{RS}}{2^{10}}\right\rfloor + 2^{10}(K \cdot n_s + l + 1)\left(2 \cdot \left(N_{ID}^{RS} \bmod 2^{10}\right) + 1\right) + N_{ID}^{RS}\bmod 2^{10}\right)\bmod 2^N \quad \text{[Equation (3)]}$$

- $c_{init}$: denotes a sequence initialization value for sequence initialization. For example, $c_{init}$ may be a Gold sequence initialization value. However, sequence initialization methods according to various embodiments of the present disclosure may be applied not only to initialization of a Gold sequence but also to initialization of other sequences. In this case, $c_{init}$ may mean other sequence initialization values.
- N: is 1 or a natural number greater than 1. N may denote the length of a Gold sequence. For example, in the case of a length-31 Gold sequence, N may be 31. However, sequence initialization methods according to various embodiments of the present disclosure may be applied not only to initialization of a Gold sequence but also to initialization of other sequences. In this case, N may mean the lengths of other sequences.
- M: is 1 or a natural number greater than 1. M may be defined as a fixed value. M may be related to the bit size of $N^{RS}_{ID}$. The bit size (e.g., 12 bits) of $N^{RS}_{ID}$ ($n^{PRS}_{ID,seq}$) for a PRS may be larger than the bit size (e.g., 10 bits) of $N^{RS}_{ID}$ ($n_{ID}$) for a CSI-RS. M may be determined in consideration of the difference between the bit size of $n^{PRS}_{ID,seq}$ and the bit size of $n_{ID}$. For example, M may be 19, but the present disclosure is not limited thereto.
- $N^{RS}_{ID} \in \{0, 1, \ldots, 2^x-1\}$ and/or $N^{RS}_{ID} \in \{0, 1, \ldots, 2^M-1\}$: denotes a specific RS (e.g., PRS) sequence ID, a scrambling ID and/or resource ID of a specific RS (e.g., PRS) resource, and/or an ID representing a resource, which is configured/indicated for each resource. For example, $N^{RS}_{ID}$ up may be represented/configured/indicated with X (>0) bits and/or M (>0) bits.
- K: is 1 or a natural number greater than 1. K may be defined as a fixed value. K may be related to the number of symbols per slot. For example, considering that one slot consists of 14 symbols (in the case of a normal CP), K may be defined as K=14. Alternatively, considering that one slot consists of 12 symbols (in the case of an extended CP), K may be defined as K=12. If sequence initialization is performed on a PRS block basis and/or on a PRS occasion basis, the K value may be defined/configured as the number of symbols included in one PRS block and/or PRS occasion.
- $n_s - \{0, 1, 2, \ldots \}$: denotes a slot index and/or a slot number. $n_s \in \{0, 1, 2 \ldots \}$ may be a slot index and/or a slot number in a frame. In NR, considering that the number of slots/symbols included in a frame may vary depending on SCSs, the maximum value of $n_s$ may vary depending on SCS numerologies of NR.
- $l \in \{0, 1, 2, \ldots, 13\}$: denotes an OFDM symbol index within a slot.
- mod: denotes a modulo arithmetic or operation. The modular operation may be an operation to obtain a remainder r obtained by dividing a dividend q by a divisor d (r=q mod (d)).

In Equation (3), 2^10 may reflect 10 bits for representing the number of cell IDs.

In Equation (3), among 31 bits of a length-31 Gold sequence, first 10 bits and last M−10 bits may be reserved to indicate and/or configure $N^{RS}_{ID}$.

If a specific ID (e.g., scrambling ID) represented/configured with L bits at the PRS resource set level, $N^{RSSet}_{ID}$ is additionally considered for Equation (3) for sequence initialization, Equation (3) for sequence initialization may be modified. Equation (3-1) may be considered.

$$c_{init} = \left(2^{N-(M-10)}\left\lfloor\frac{N_{ID}^{RS}}{2^{10}}\right\rfloor + 2^{L+10}(K \cdot n_s + l + 1)2 \cdot \left(N_{ID}^{RS}\bmod 2^{10}\right) + 1\right) + 2^{10}N_{ID}^{RSSet} + N_{ID}^{RS}\bmod 2^{10}\right)\bmod 2^N \quad \text{[Equation (3-1)]}$$

As a more specific example of the sequence initialization method of Proposal #2 according to various embodiments of the present disclosure, the following may be considered.

A UE may assume that a PRS sequence r(m) is defined as follows.

$$r(m) = \frac{1}{\sqrt{2}}(1 - 2c(2m)) + j\frac{1}{\sqrt{2}}(1 - 2c(2m+1))$$

For example, a pseudo-random sequence c(i) may be the above-described Gold sequence. A pseudo-random sequence generator may be initialized as follows.

$$c_{init} = \left(2^{22}\left\lfloor\frac{n^{PRS}_{ID,seq}}{1024}\right\rfloor + 2^{10}\left(N^{slot}_{symb}n^{\mu}_{s,f} + l + 1\right)\left(2\left(n^{PRS}_{ID,seq}\bmod 1024\right) + 1\right) + n^{PRS}_{ID,seq}\bmod 1024\right)\bmod 2^{31}$$

For example, $n^{\mu}_{s,f}$ denotes a slot number. Alternatively, $n^{\mu}_{s,f}$ may be a slot number in a frame.

For example, a DL PRS sequence ID $n^{PRS}_{ID,seq} \in \{0, 1, \ldots, 4095\}$ may be given by a higher layer parameter (e.g., DL-PRS-SequenceId).

For example, l may be an OFDM symbol (index) in a slot to which a sequence is mapped.

The sequence initialization method of Proposal #2 according to various embodiments of the present disclosure, for example, Equation (3) may be designed in consideration of the difference between the bit size (e.g., 12 bits) of $N^{RS}_{ID}$ ($n^{PRS}_{ID,seq}$) for a PRS and the bit size (e.g., 10 bits) of $N^{RS}_{ID}$ ($n_{ID}$) for a CSI-RS.

According to the sequence initialization method of Proposal #2 according to various embodiments of the present disclosure, for example, Equation (3), if the value of $N^{RS}_{ID}$ ($n^{PRS}_{ID,seq}$) for the PRS is the same as the value of $N^{RS}_{ID}$ ($n_{ID}$) of the CSI-RS, the value of $c_{init}$ for the PRS may be designed to be the same as the value of $c_{init}$ for the CSI-RS.

According to the sequence initialization method of Proposal #2 according to various embodiments of the present disclosure, for example, Equation (3), when the PRS and CSI-RS are used together as an RS for positioning, the UE may only need to check the same resource location for both the PRS and CSI-RS. That is, the UE may expect to receive the PRS and/or CSI-RS at the same resource location. In other words, the UE may not need to additionally identify other resource locations.

Thus, according to the sequence initialization method of Proposal #2 according to various embodiments of the present disclosure, for example, Equation (3), when the PRS and CSI-RS are used together as the RS for positioning, the UE implementation complexity may be reduced.

The sequence initialization method of Proposal #2 according to various embodiments of the present disclosure, for example, Equation (3) may be applied regardless of whether the UE is NR configured/provided with $N^{RSSet}_{ID}$. In other words, the sequence initialization method of Proposal #2 according to various embodiments of the present disclosure, for example, Equation (3) may be applied regardless of whether the UE is configured/provided with a PRS resource set.

3.1.3. [Proposal #3] Use of Sequence Considering PRS Block/Occasion

Additionally, when a specific PRS resource included in a specific PRS resource set is used to configure different PRS blocks and/or PRS occasions, a UE may need to detect the specific PRS resource by identifying the PRS blocks. Thus, according to various embodiments of the present disclosure, all or some of the following elements may be considered.

PRS block information: The PRS block information may include a PRS block index and/or a specific ID assigned/configured for each PRS block (e.g., scrambling sequence ID per PRS block).
  For example, the PRS block may include PRS resources and/or PRS resource sets transmitted from a specific TP/BS and/or a plurality of TPs/BSs on a specific TX beam. The PRS block may mean a transmission unit for transmitting a PRS over one or more symbols.
PRS occasion information: The PRS occasion information may include a PRS occasion index and/or a specific ID assigned/configured for each PRS occasion (e.g., scrambling sequence ID per PRS block).
  For example, the PRS occasion may be defined/configured as a group of one or more PRS blocks and/or a group of one or more slots in which a PRS is transmitted.
PRS resource set information: The PRS resource set information may include a PRS resource set index and/or a specific ID assigned/configured for each PRS resource set (e.g., scrambling sequence ID per PRS resource set).

For example, it may be considered for efficient use of time-frequency radio resources that different TPs/BSs transmit a specific PRS resource block on the same time and/or frequency resources. In this case, different sequences may need to be used (by the different TPs/BSs) so that the UE is capable of efficiently identifying PRS blocks transmitted in the time and/or frequency resources. To this end, different sequence initialization values may be configured/allocated (by the different TPs/BSs).

As described above, when a specific PRS resource included in a specific PRS resource set is used to configure different PRS blocks and/or different PRS occasions, the UE may need to detect the specific PRS resource by identifying the PRS blocks. Thus, a sequence initialization operation according to Equation (4) may be considered.

$$c_{init} = f(N^{RS}_{ID}, N^{RSSet}_{ID}, N^{Block}_{ID}, n_s, l) \quad \text{[Equation (4)]}$$

The following five factors may be considered for Equation (4). That is, the sequence initialization operation according to Equation (4) may be performed with respect to the following five factors.

$c_{init}$: denotes a sequence initialization value for sequence initialization. For example, $c_{init}$ may be a Gold sequence initialization value. However, sequence initialization methods according to various embodiments of the present disclosure may be applied not only to initialization of a Gold sequence but also to initialization of other sequences. In this case, $c_{init}$ may mean other sequence initialization values.

$N^{RS}_{ID} \in \{0, 1, \ldots, 2^x-1\}$ and/or $N^{RS}_{ID} \in \{0, 1, \ldots, 2^M-1\}$: denotes a specific RS (e.g., PRS) sequence ID, a scrambling ID and/or resource ID of a specific RS (e.g., PRS) resource, and/or an ID representing a resource, which is configured/indicated for each resource. For example, $N^{RS}_{ID}$ may be represented/configured/indicated with X (>0) bits and/or M (>0) bits.

$N^{RSSet}_{ID} \in \{0, 1, \ldots, 2^y-1\}$ and/or $N^{RSSet}_{ID} \in \{0, 1, \ldots, 2^L-1\}$: denotes a scrambling ID configured for each specific RS (e.g., PRS) resource set, a resource set ID, and/or an ID representing a resource set. For example, $N^{RSSet}_{ID}$ may be represented/configured/indicated with Y (>0) bits and/or L (>0) bits.

$N^{Block}_{ID} \in \{0, 1, \ldots, 2^W-1\}$: denotes a PRS block index (PRS block group index, PRS occasion index, and/or PRS occasion group index). For example, $N^{Block}_{ID} \in \{0, 1, \ldots, 2^W-1\}$ may be defined/configured with a total of W bits (W≥0).

$n_s \in \{0, 1, 2, \ldots\}$: denotes a slot index and/or a slot number. $n_s \in \{0, 1, 2, \ldots\}$ may be a slot index and/or a slot number in a frame. In NR, considering that the number of slots/symbols included in a frame may vary depending on SCSs, the maximum value of $n_s$ may vary depending on SCS numerologies of NR.

$l \in \{0, 1, 2, \ldots 13\}$: denotes an OFDM symbol index within a slot.

As a more specific example, $c_{init}$ of Equation (4) for sequence initialization may be defined as in Equation (4-1). That is, a sequence initialization method based on Equation (4-1) may be considered.

$$c_{init} = (2^{M+L+W} \times ((Kn_s+l+1)(2N^{RS}_{ID}+1)) + p(N^{RS}_{ID}, N^{RSSet}_{ID}, N^{Block}_{ID})) \bmod 2^N \quad \text{[Equation (4-1)]}$$

M: is 1 or a natural number greater than 1. M may be defined as a fixed value. M may be related to the bit size of $N^{RS}_{ID}$. The bit size (e.g., 12 bits) of $N^{RS}_{ID}$ ($N^{PRS}_{ID,seq}$) for a PRS may be larger than the bit size (e.g., 10 bits) of $N^{RS}_{ID}$ ($n_{ID}$) for a CSI-RS. M may be determined in consideration of the difference between the bit size of $N^{PRS}_{ID,seq}$ and the bit size of $n_{ID}$. For example, M may be 19, but the present disclosure is not limited thereto.

L: is 1 or a natural number greater than 1. L may be defined as a fixed value. L may be related to the bit size of $N^{RSSet}_{ID}$. For example, if $N^{RSSet}_{ID}$ is represented/configured/indicated with Y (>0) bits, L=Y.

K: is 1 or a natural number greater than 1. K may be defined as a fixed value. K may be related to the number of symbols per slot. For example, considering that one slot consists of 14 symbols (in the case of a normal CP), K may be defined as K=14. Alternatively, considering that one slot consists of 12 symbols (in the case of an extended CP), K may be defined as K=12. If sequence initialization is performed on a PRS block basis and/or on a PRS occasion basis, the K value may be defined/configured as the number of symbols included in one PRS block and/or PRS occasion.

$n_s \in \{0, 1, 2, \ldots\}$: denotes a slot index and/or a slot number. $n_s \in \{0, 1, 2, \ldots\}$ may be a slot index and/or a slot number in a frame. In NR, considering that the number of slots/symbols included in a frame may vary depending on SCSs, the maximum value of $n_s$ may vary depending on SCS numerologies of NR.

$l \in \{0, 1, 2, \ldots 13\}$ denotes an OFDM symbol index within a slot.

mod: denotes a modulo arithmetic or operation. The modular operation may be an operation to obtain a remainder r obtained by dividing a dividend q by a divisor d (r=q mod(d)).

As a more specific example, $p(N^{RS}_{ID}, N^{RSSet}_{ID}, N^{Block}_{ID})$ of Equation (4) for sequence initialization may be defined as in Equation (4-2).

$$p(N^{RS}_{ID}, N^{RSSet}_{ID}, N^{Block}_{ID}) = 2^{M+L} \times N^{Block}_{ID} + 2^M \times N^{RSSet}_{ID} + N^{RS}_{ID}$$ [Equation (4-2)]

In Equation (4-2), NSD the order of $N^{Block}_{ID}$, $N^{RSSet}_{ID}$, and $N^{RS}_{ID}$ may vary. In addition, since the exponential power of 2 preceding each factor varies, which is determined based on the number of bits allocated to each factor, an intuitive modification of Equation (4-2) may be included in various embodiments of the present disclosure.

3.1.4. [Proposal #4] Configuration of Multiple Scrambling Sequence IDs for Specific RS Resource In addition to the above-described embodiments of the present disclosure, the following method may be considered to allow a UE to obtain measurements by identifying specific (same) RS (e.g., PRS) resources transmitted from different specific TPs/BSs according to various embodiments of the present disclosure.

For example, a BS and/or LMF may configure/indicate a plurality of scrambling sequence IDs for a specific RS (e.g., PRS) resource. That is, the BS and/or LMF may configure different scrambling sequence IDs for one PRS resource, and the different scrambling sequence IDs may be in conjunction with a specific TP and/or a specific RS (e.g., PRS) resource set.

The BS and/or LMF may configure/indicate a plurality of scrambling sequence IDs for one RS resource only when a specific RS resource is included in (or belongs to) multiple RS resource sets. For example, if a specific RS resource is configured to be included in two or more RS resource sets, the UE may automatically recognize that multiple scrambling sequence IDs (e.g., as many as the number of RS resource sets including the specific RS resource) are configured.

The BS may report some or all of the sequence initialization information to the LMF/location server, and if necessary, the LMF/location server may request some or all of the sequence initialization information from the BS.

3.1.5. [Proposal #5] Default Behavior.

3.1.5.1. Meaning of Identifying to Which PRS Resource Set PRS Resource Belongs

In the case of a PRS, a specific PRS resource set may be linked/connected/associated with a specific TP unlike other RSs. For example, DL PRS resources included in a DL PRS resource set may be associated with the same TRP. That is, a specific PRS resource set may be transmitted only by a specific TP.

However, a specific PRS resource may be a member of one or more PRS resource sets. That is, a specific PRS resource included in different PRS resource sets may be transmitted from multiple TPs.

Accordingly, if a UE is capable of recognizing in which PRS resource set a specific PRS resource is included when receiving the PRS resource, the UE may also recognize which TP transmits the PRS resource.

From the perspective of TPs, a specific TP may transmit two or more PRS resource sets, instead of being linked/connected/associated with only one PRS resource set. For example, if a specific TP has two TX panels, it may be assumed that the specific TP transmits one PRS resource set for each panel. In other words, if the UE is capable of recognizing in which PRS resource set a specific PRS resource is transmitted, the UE may also recognize through which panel among the transmission panels of the TP the PRS resource is transmitted. That is, when the BS/location server indicates/configures to the UE a specific PRS resource set by linking/connecting/associating the specific PRS resource set with a specific panel of a specific TP, the UE may identify more specific information than identifying which TP transmits the PRS resource. In consideration of the above, the following default behavior of the UE may be provided in various embodiments of the present disclosure.

3.1.5.2. (Default Behavior Proposal) Default Behavior when $N^{RSSet}_{ID}$ is not Configured In various embodiments of the present disclosure, the default behavior of the UE is provided when $N^{RSSet}_{ID}$ (i.e., a specific ID configured at the RS set level, for example, an RS set ID and/or a sequence ID configured at the RS set level) is not configured.

In one or more of the above-described sequence initialization equations (e.g., Equation (0), Equation (1), Equation (1-1), Equation (1-2), Equation (2), and Equation (2-1)), if a BS/location server does not indicate/configure $N^{RSSet}_{ID}$ to a UE, the UE may interpret/consider/assume that $N^{RSSet}_{ID}$ is an ID configured/indicated at the TP level (e.g., a TP ID, a specific ID configured together with a TP, and/or a sequence ID indicated/configured for each TP). For reference, Equation (1), Equation (2), and Equation (2-1) may be examples of Equation (0), and Equation (1-1) and Equation (1-2) may be examples for the definition of the function g.

That is, in one or more of the above-described sequence initialization equations, the UE may perform calculation by substituting a specific TP ID linked/connected/associated with an RS resource set rather than a sequence ID configured at the RS set level. Then, the UE may determine a sequence initialization value based on the above calculation.

The above-described UE operation may configured/indicated by the BS/location server.

When each PRS set is linked/connected/associated with a specific TP, the above-described characteristics may be very useful. For example, if the UE is capable of recognizing in which PRS resource set a specific PRS resource is included upon receiving the specific PRS resource, the UE may also recognize which TP transmits the PRS resource.

Alternatively, if the BS/location server does not indicate/configure $N^{RSSet}_{ID}$ to the UE, the UE may interpret/consider/assume $N^{RSSet}_{ID}$ as a physical cell ID (PCID).

That is, the PCID may be substituted rather than $N^{RSSet}_{ID}$ in the sequence initialization equations.

The above-described UE operation may configured/indicated by the BS/location server.

There may be a case where one cell corresponds to one TP, and in this case, it may be reasonable to consider $N^{RSSet}_{ID}$ as a cell ID rather than a TP ID.

Alternatively, if the BS/location server does not indicate/configure $N^{RSSet}_{ID}$ to the UE, the UE may compute the sequence initialization equations by substituting 0 rather than $N^{RSSet}_{ID}$.

The default behavior of the UE when $N^{RS}_{ID}$ is not configured/indicated will be described below according to various embodiments of the present disclosure.

3.1.5.3. Fixed Sequence within Slot

Although PRS sequence initialization may vary for each OFDM symbol as described above, it may be unnecessary to generate a new sequence for each symbol.

A PRS may be continuously transmitted in a large number of OFDM symbols (e.g., a predetermined number or more of OFDM symbols) over multiple slots (and/or subframes) depending on PRS configurations such as a PRS occasion/block/group, unlike other RSs such as a CSI-RS, a DM-RS, an SSB, etc.

In this case, if a UE performs cross-correlation operation by using a different sequence (different sequence initialization value) for each OFDM symbol, it may become a burden in terms of the UE complexity.

In addition, a location server/LMF may manage resources such that a specific/identical PRS resource is not shared by a serving cell and a neighboring cell. The PRS resource may not necessarily be transmitted by the neighboring cell.

Alternatively, the location server/LMF may manage resources such that different cells/TPs/BSs rarely share some or all time-frequency resources to transmit a PRS.

For a PRS transmitted for UE positioning, since the RS is transmitted from multiple cells/TPs/BSs and received by target UEs in the multiple cells/TPs/BSs, the location server/LMF may perform scheduling/management such that multiple adjacent cells/TPs/BSs do not transmit different PRS resource IDs (e.g., PRS resource IDs) on the same time-frequency resources.

Based on the above, a method of changing a sequence initialization value only for one or more of the following elements/variables rather than depending on OFDM symbols is provided in various embodiments of the present disclosure.

Slot index, PRS resource, PRS resource set, TP, and/or cell/BS information (e.g., cell ID)

This may be expressed as in Equation (0-1).

$$c_{init}=f(N^{RS}_{ID},N^{RSSet}_{ID},n_s)$$ [Equation (0-1)]

That is, a sequence initialization equation may be obtained by removing the symbol index l from one or more of the above-described sequence initialization equations.

3.1.5.4. Additional Proposal #1: Default Behavior Proposal

In the case of a PRS, it may be important that a UE is capable of recognizing which cell (BS) and which TP (e.g., remote radio head (RRH)) transmits the PRS, unlike other RSs.

For this reason, a PRS resource set ID and/or a TP ID as well as a scrambling sequence ID configured for a PRS resource may be used together for sequence initialization in one or more of the above-described PRS sequence initialization equations.

According to various embodiments of the present disclosure, it is proposed that a CSI-RS sequence initialization method is extended/applied in consideration of backward compatibility with sequence initialization methods for other RSs (e.g., CSI-RS, etc.).

As an RS sequence initialization method, a function having one or more elements among the total number of symbols per slot, a slot index within a frame, a symbol index within a slot, a scrambling sequence ID of an RS resource, and/or an RS resource ID may be considered.

For example, a sequence initialization value may be configured/indicated as in Equation (5).

$$c_{init}=f(N^{slot}_{symb},n^\mu_{s,f},l,N^{RS}_{ID})$$ [Equation (5)]

For example, a sequence initialization method for a CSI-RS resource may be defined as in Equation (5-1).

$$c_{init}=(2^{10}(N^{slot}_{symb}n^\mu_{s,f}+l+1)(2N^{RS}_{ID}+1)+N^{RS}_{ID}) \bmod 2^{31}$$ [Equation (5-1)]

$N^{slot}_{symb} \in \{14, 12\}$: denotes the number of symbols per slot (# of symbols per slot). The number of symbols per slot may vary depending on CP lengths. For example, in the case of a normal CP, the number of symbols per slot may be 14. In the case of an extended CP, the number of symbols per slot may be 12. The number of symbols per slot may be defined/configured to other values other than 14 or 12.

$n^\mu_{s,f} \in \{0, 1, \ldots, K\}$: denotes a slot index within a frame. In NR, the number of slots/symbols included in a frame may vary depending on numerologies. For example, when SCS=15 kHz, K=19 because one frame includes 10 slots. When SCS=15 kHz, $n^\mu_{s,f} \{0, 1 \ldots, 19\}$ may be satisfied.

$l \in \{0, 1, 2, \ldots, 13\}$: denotes an OFDM symbol index within a slot. In NR, one slot may include 14 symbols (in the case of a normal CP).

$N^{RS}_{ID} \in \{0, 1, \ldots, 2^{B-1}\}$: may be indicated/configured with an RS (e.g., PRS) sequence ID and/or an RS resource ID. Here, B denotes the number of bits used to configure an RS scrambling sequence ID and may be 1 or a natural number greater than 1. For example, if the scrambling sequence ID is configured with 12 bits, $N^{RS}_{ID} \in \{0, 1, \ldots, 2^{12}-1\}$ may be satisfied.

In this case, if $N^{RS}_{ID}$ is not configured/indicated, the UE may recognize/consider $N^{RS}_{ID}$ as a TP ID rather than a PCID.

Alternatively, if $N^{RS}_{ID}$ is not configured/indicated, the UE may recognize/consider $N^{RS}_{ID}$ as a scrambling ID configured at the TP level rather than a TP ID.

The above-described UE operation may configured/indicated by the BS/location server.

The above-described UE operation may be applied not only to the sequence initialization methods according to Equation (5) and Equation (5-1) but also to one or more of the above-described sequence initialization equations (for example, Equation (0), Equation (0-1), Equation (1), Equation (1-1), Equation (1-2), Equation (2), Equation (2-1), Equation (3), Equation (3-1), Equation (4), Equation (4-1), Equation (4-2), etc.).

(Effects) A specific PRS resource may be configured/indicated to be transmitted from multiple TPs. However, when a scrambling sequence ID $N^{RS}_{ID}$ is not configured among PRS resource configuration parameters, if the UE regards $N^{RS}_{ID}$ as a PCID other than the (scrambling) sequence ID, it may be difficult for the UE to determine which TP transmits the PRS resource.

In addition, a scrambling sequence ID may not need to be configured for each transmitted PRS resource. In this case, necessary information may be information on a TP that transmits a PRS resource.

For example, it is assumed that a specific TP transmits multiple PRS resources to a UE on the same TX beam to configure appropriate TX/RX beams between the TP and UE. In this assumption, various methods may be used to inform the UE that the multiple PRS resources are transmitted on the same TX beam. The purpose of the operation may be to find an appropriate RX beam of the UE and change the RX beam of the UE while transmitting multiple PRS resources on the same TX beam.

Assuming that the corresponding operation is repeated on multiple TX beams, if the UE is configured with a sequence ID for each PRS resource, signaling overhead may unnecessarily increase. Assuming that 12 bits are used for a PRS scrambling ID for each resource, signaling of 120 bits may be required for 10 PRS resources, and as a result, signaling overhead may unnecessarily increase.

When a specific PRS resource is transmitted from different TPs, the UE needs to perform measurement for each TP to obtain timing measurements for the PRS resource such as a time of arrival (ToA), a time of flight (ToF), a propagation time, etc. However, if a PRS resource is transmitted by multiple TPs but the same sequence is used, it may be difficult for the UE to distinguish the ToA/ToF/propagation time by identifying the PRS resource transmitted from each TP because the same time-frequency resources are used for the same PRS resource.

In this case, considering that a timing measurement is obtained by measuring the first peak of a received signal, the UE may obtain the timing measurement such as the ToA/ToF/propagation time for the TP closest to the UE among the multiple TPs when measuring the ToA/ToF/propagation time of the PRS resource.

However, according to various embodiments of the present disclosure, a method of indirectly identifying the same PRS resource transmitted from different TPs based on a CSI-RS sequence initialization method may be provided.

When a specific PRS resource is transmitted from one or more multiple TPs, the BS/location server may intentionally configure no scrambling sequence ID for the PRS resource.

In addition, when no scrambling sequence ID is configured for the PRS resource, the UE may interpret a TP ID instead of a scrambling sequence ID. That is, the UE may interpret the TP ID of a TP linked/connected/associated with a PRS resource and/or a PRS resource set including the PRS resource.

Eventually, even if the BS/location server configures a specific PRS resource to be transmitted from multiple TPs, the UE may identify the PRS resource due to different sequences.

3.1.5.5. Additional Proposal #2: Default Behavior Proposal

As a (scrambling) sequence ID and/or an ID similar thereto, a specific ID used for sequence initialization may be configured/indicated for each RS resource as in a CSI-RS.

However, since the sequence initialization value varies depending on the symbol index and/or slot index, the ID may not be necessarily different for each RS resource.

In terms of signaling overhead, if one sequence ID is assigned to a set/group of RS resources and the same value is used therefor, there may be an advantage of significantly lowering the signaling overhead.

That is, the BS/location server may configure/indicate to the UE the (scrambled) sequence ID of an RS (e.g., PRS) for each RS (e.g., PRS) resource set (and/or each RS resource group).

Consequently, assuming that T (an integer or natural number greater than or equal to 0) PRS resource sets are connected/linked/associated with one TP, each TP may use a total of T sequences. In this case, the BS/location server may configure/indicate the PRS resource sets to the UE such that different TPs use different sequences.

Examples of the above-described proposed methods may also be included as one of various embodiments of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

3.2. Initial Network Access and Communication Process

According to various embodiments of the present disclosure, a UE may perform a network access process to perform the above-described/proposed procedures and/or methods. For example, the UE may receive system information and configuration information required to perform the above-described/proposed procedures and/or methods and store the received information in a memory. The configuration information required for various embodiments of the present disclosure may be received by higher-layer signaling (e.g., RRC signaling or MAC signaling).

Figure 21:
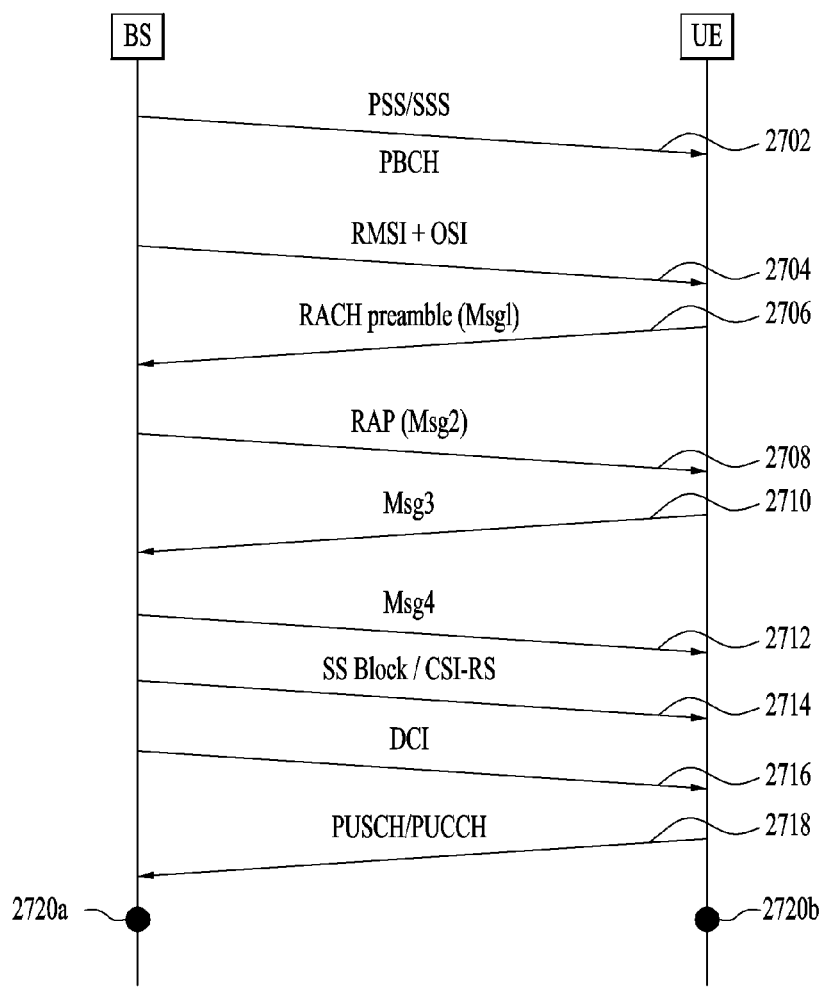
FIG. 21 is a simplified diagram illustrating an initial network access and subsequent communication procedure according to various embodiments of the present disclosure.

FIG. 21 is a diagram illustrating an initial network access and subsequent communication process. In an NR system to which various embodiments of the present disclosure are applicable, a physical channel and an RS may be transmitted by beamforming. When beamforming-based signal transmission is supported, beam management may be performed for beam alignment between a BS and a UE. Further, a signal proposed in various embodiments of the present disclosure may be transmitted/received by beamforming. In RRC_IDLE mode, beam alignment may be performed based on a synchronization signal block (SSB or SS/PBCH block), whereas in RRC_CONNECTED mode, beam alignment may be performed based on a CSI-RS (in DL) and an SRS (in UL). On the contrary, when beamforming-based signal transmission is not supported, beam-related operations may be omitted in the following description.

Referring to FIG. 21, a BS (e.g., eNB) may periodically transmit an SSB (2702). The SSB includes a PSS/SSS/PBCH. The SSB may be transmitted by beam sweeping. The BS may then transmit remaining minimum system information (RMSI) and other system information (OSI) (2704). The RMSI may include information required for the UE to perform initial access to the BS (e.g., PRACH configuration information). After detecting SSBs, the UE identifies the best SSB. The UE may then transmit an RACH preamble (Message 1; Msg1) in PRACH resources linked/corresponding to the index (i.e., beam) of the best SSB (2706). The beam direction of the RACH preamble is associated with the PRACH resources. Association between PRACH resources (and/or RACH preambles) and SSBs (SSB indexes) may be configured by system information (e.g., RMSI). Subsequently, in an RACH procedure, the BS may transmit a random access response (RAR) (Msg2) in response to the RACH preamble (2708), the UE may transmit Msg3 (e.g., RRC Connection Request) based on a UL grant included in the RAR (2710), and the BS may transmit a contention resolution message (Msg4) (2712). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (2714). The SSB/CSI-RS may be used for the UE to generate a beam/CSI report. The BS may request the UE to transmit a beam/CSI report, by DCI (2716). In this case, the UE may generate a beam/CSI report based on the SSB/CSI-RS and transmit the generated beam/CSI report to the BS on a PUSCH/PUCCH (2718). The beam/CSI report may include a beam measurement result, information about a preferred beam, and so on. The BS and the UE may switch beams based on the beam/CSI report (2720a and 2720b).

Subsequently, the UE and the BS may perform the above-described/proposed procedures and/or methods. For example, the UE and the BS may transmit a wireless signal by processing information stored in a memory or may process received wireless signal and store the processed signal in the memory according to various embodiments of the present disclosure, based on configuration information obtained in the network access process (e.g., the system information acquisition process, the RRC connection process through an RACH, and so on). The wireless signal may include at least one of a PDCCH, a PDSCH, or an RS on DL and at least one of a PUCCH, a PUSCH, or an SRS on UL.

The above-described initial access procedure may be combined with the details described above in Clauses 1 to 3 to implement other various embodiments of the present disclosure, which will be clearly understood by those of ordinary skill in the art.

Figure 22:
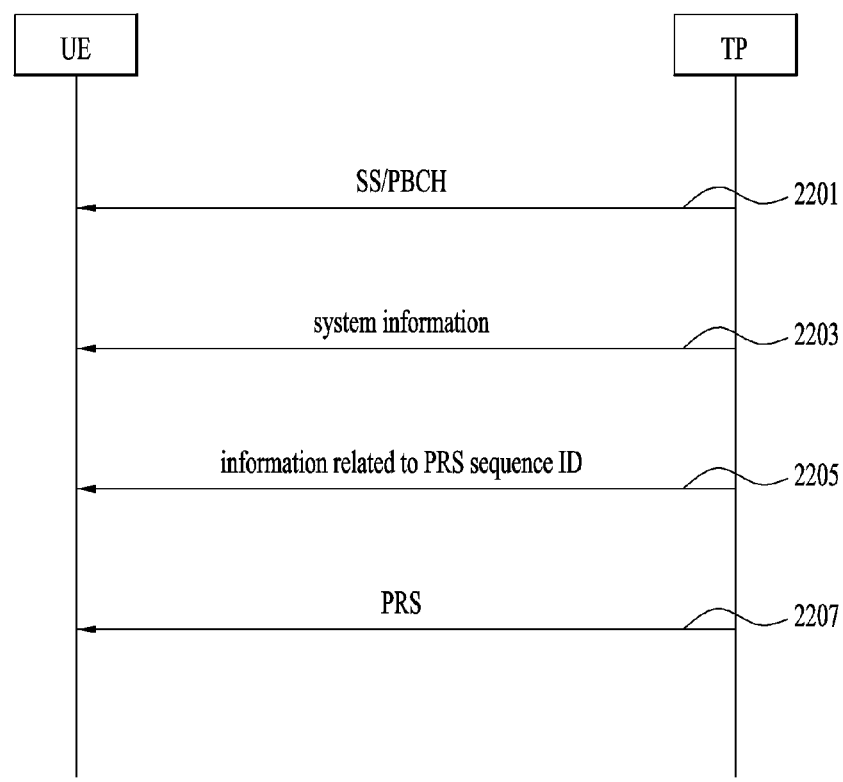
FIG. 22 is a diagram schematically illustrating an operating method for a UE and a transmission point (TP) according to various embodiments of the present disclosure.

FIG. 22 is a diagram schematically illustrating an operating method for a UE and a TP according to various embodiments of the present disclosure.

Figure 23:
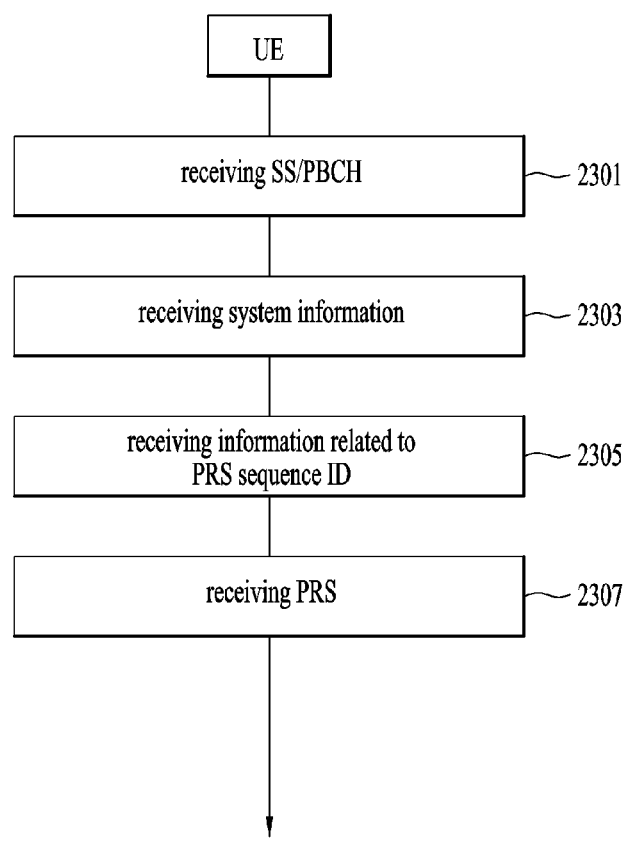
FIG. 23 is a flowchart illustrating an operating method for a UE according to various embodiments of the present disclosure.

FIG. 23 is a flowchart illustrating an operating method for a UE according to various embodiments of the present disclosure.

Figure 24:
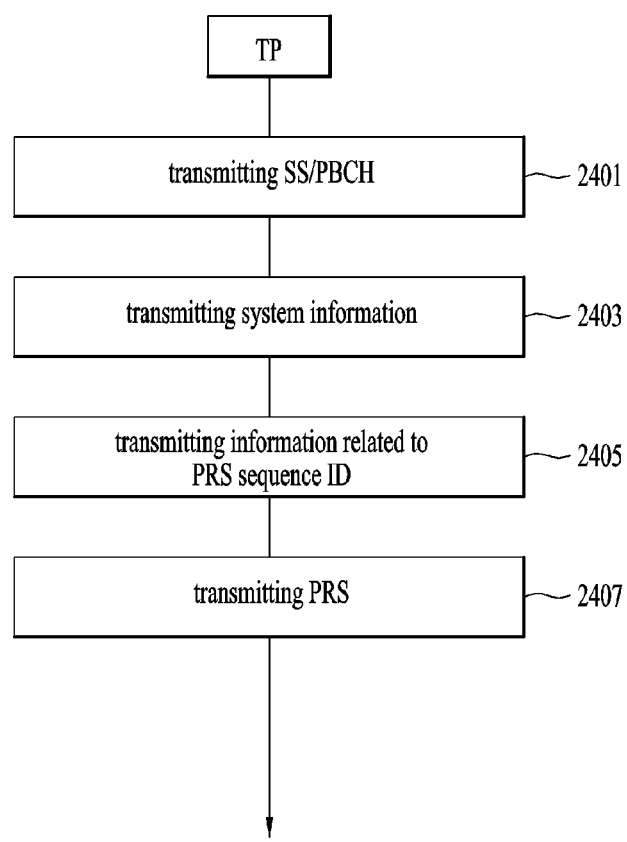
FIG. 24 is a flowchart illustrating an operating method for a TP according to various embodiments of the present disclosure.

FIG. 24 is a flowchart illustrating an operating method for a TP according to various embodiments of the present disclosure.

Referring to FIGS. 22 to 24, in operations 2201, 2301, and 2401 according to exemplary embodiments, the TP may transmit a synchronization signal/physical broadcast channel (SS/PBCH) block including a primary synchronization signal (PSS), a secondary synchronization signal (SSS), and a physical broadcast channel (PBCH). In addition, the UE may receive the SS/PBCH block.

In operations 2203, 2303, and 2403 according to exemplary embodiments, the TP may transmit system information, and the UE may receive the system information.

In operations 2205, 2305, and 2405 according to exemplary embodiments, the TP may transmit information related to a PRS sequence ID, and the UE may receive the information.

In operations 2207, 2307, and 2407 according to exemplary embodiments, the TP may transmit a PRS related to the PRS sequence ID, and the UE may receive the PRS.

For example, a pseudo-random sequence generator related to PRS sequence generation may be initialized according to the following equation:

$$c_{init} = \left(2^{31-(M-10)} \left\lfloor \frac{N_{ID}^{RS}}{2^{10}} \right\rfloor + \right.$$

-continued
$$\left. 2^{10}(K \cdot n_s + l + 1)(2 \cdot (N_{ID}^{RS} \bmod 1024) + 1) + N_{ID}^{RS} \bmod 1024 \right) \bmod 2^{31}.$$

For example, M may be a natural number, K may be the number of OFDM symbols per slot, $n_s$ may be a slot index, l may be an OFDM symbol index within a slot, $N^{RS}_{ID}$ may be the PRS sequence ID, and mod may be a modular operation.

For example, $N^{RS}_{ID}$ may be configured by a higher layer. $N^{RS}_{ID}$ may satisfy the following relationship: $N^{RS}_{ID} \in \{0, 1, \ldots, 4095\}$ or $N^{RS}_{ID} \in \{0, 1, \ldots, 2^{19-1}\}$.

For example, M may be a natural number greater than 10 and smaller than 31. For example, M may be 19.

For example, a sequence of the PRS may satisfy a value obtained from a predetermined length-31 Gold sequence.

More specific operations of the UE and/or the TP according to the above-described various embodiments of the present disclosure may be explained and performed based on the descriptions of clause 1 to clause 3.

Examples of the above-described proposed methods may also be included as one of various embodiments of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

4. Exemplary Configurations of Devices Implementing Various Embodiments of the Present Disclosure 4.1. Exemplary Configurations of Devices to which Various Embodiments of the Present Disclosure are Applied FIG. 25 is a diagram illustrating devices that implement various embodiments of the present disclosure.

Figure 25:
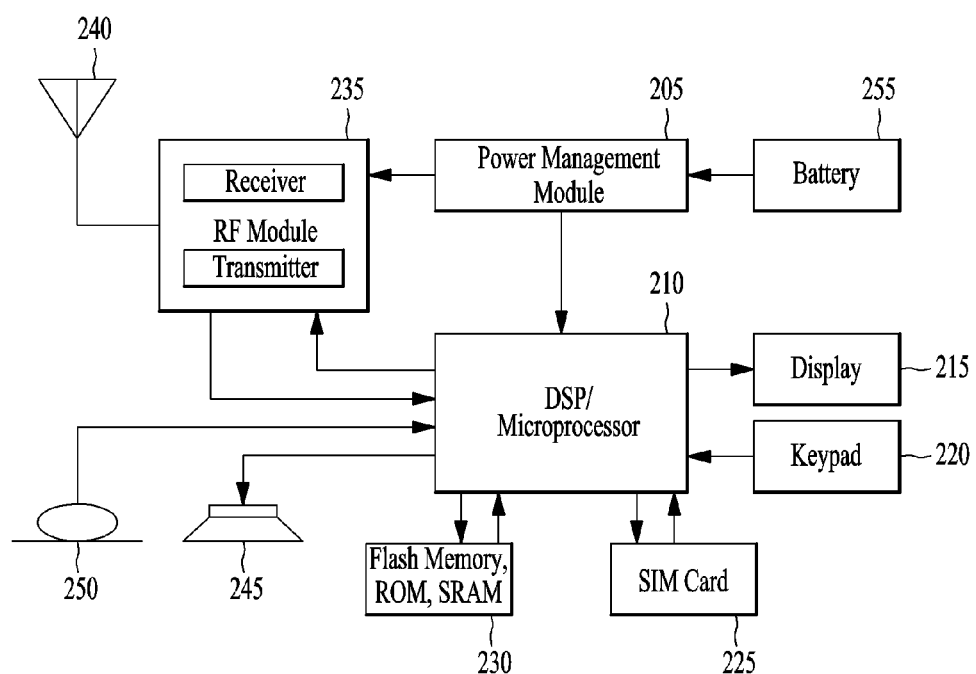
FIG. 25 is a diagram illustrating devices that implement various embodiments of the present disclosure.

The devices illustrated in FIG. 25 may be a UE and/or a BS (e.g., eNB or gNB) adapted to perform the afore-described mechanisms, or any devices performing the same operation.

Referring to FIG. 25, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 25 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 25 may illustrate a network device including a transmitter 235 configured to transmit a request message to a UE and a receiver 235 configured to receive timing transmission/reception timing information from the UE. These transmitter and receiver may form the transceiver 235.

The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various embodiments of the present disclosure, the at least one processor included in the UE (or the at least one processor included of the communication device included in the UE) may receive an SS/PBCH block including a PSS, an SSS, and a PBCH.

According to various embodiments of the present disclosure, the at least one processor included in the UE may receive system information based on the SS/PBCH block.

According to various embodiments of the present disclosure, the at least one processor included in the UE may receive information related to a PRS sequence ID.

According to various embodiments of the present disclosure, the at least one processor included in the UE may receive a PRS related to the PRS sequence ID.

For example, a pseudo-random sequence generator related to PRS sequence generation may be initialized according to the following equation:

$$c_{init} = \left( 2^{31-(M-10)} \left\lfloor \frac{N_{ID}^{RS}}{2^{10}} \right\rfloor + 2^{10}(K \cdot n_s + l + 1)(2 \cdot N_{ID}^{RS} \bmod 1024) + 1 \right) +$$

$$2^{10}(K \cdot n_s + l + 1)(2 \cdot (N_{ID}^{RS} \bmod 1024) + 1) + N_{ID}^{RS} \bmod 1024 \right) \bmod 2^{31}.$$

For example, M may be a natural number, K may be the number of OFDM symbols per slot, n s may be a slot index, l may be an OFDM symbol index within a slot, $N^{RS}_{ID}$ may be the PRS sequence ID, and mod may be a modular operation.

For example, $N^{RS}_{ID}$ may be configured by a higher layer, and the following relationship: $N^{RS}_{ID} \in \{0, 1, \ldots, 4095\}$ or $N^{RS}_{ID} \in \{0, 1, \ldots, 2^{19-1}\}$ may be satisfied.

For example, M may be a natural number greater than 10 and smaller than 31. For example, M may be 19.

For example, a sequence of the PRS may satisfy a value obtained from a predetermined length-31 Gold sequence.

According to various embodiments of the present disclosure, the at least one processor included in the BS (or the at least one processor included of the communication device included in the BS) may transmit an SS/PBCH block including a PSS, an SSS, and a PBCH.

According to various embodiments of the present disclosure, the at least one processor included in the BS may transmit system information after transmitting the SS/PBCH block.

According to various embodiments of the present disclosure, the at least one processor included in the BS may transmit information related to a PRS sequence ID.

According to various embodiments of the present disclosure, the at least one processor included in the BS may transmit a PRS related to the PRS sequence ID.

For example, a pseudo-random sequence generator related to PRS sequence generation may be initialized according to the following equation:

$$c_{init} = \left( 2^{31-(M-10)} \left\lfloor \frac{N_{ID}^{RS}}{2^{10}} \right\rfloor + 2^{10}(K \cdot n_s + l + 1)(2 \cdot N_{ID}^{RS} \bmod 1024) + 1 \right) +$$

$$N_{ID}^{RS} \bmod 1024 \right) \bmod 2^{31},$$

For example, M may be a natural number, K may be the number of OFDM symbols per slot, n s may be a slot index, l may be an OFDM symbol index within a slot, $N^{RS}_{ID}$ may be the PRS sequence ID, and mod may be a modular operation.

For example, $N^{RS}_{ID}$ may be configured by a higher layer, and the following relationship: $N^{RS}_{ID} \in \{0, 1, \ldots, 4095\}$ or $N^{RS}_{ID} \{0, 1, \ldots, 2^{19-1}\}$ may be satisfied.

For example, M may be a natural number greater than 10 and smaller than 31. For example, M may be 19.

For example, a sequence of the PRS may satisfy a value obtained from a predetermined length-31 Gold sequence.

More specific operations of the processor included in the UE and/or the BS and/or the location server according to the above-described various embodiments of the present disclosure may be described and performed based on the descriptions of clause 1 to clause 3.

Unless contradicting each other, various embodiments of the present disclosure may be implemented in combination. For example, (a processor or the like included in) a UE and/or a BS and/or a location server according to various embodiments of the present disclosure may implement the embodiments described in clause 1 to clause 3 in combination, unless contradicting each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 26:
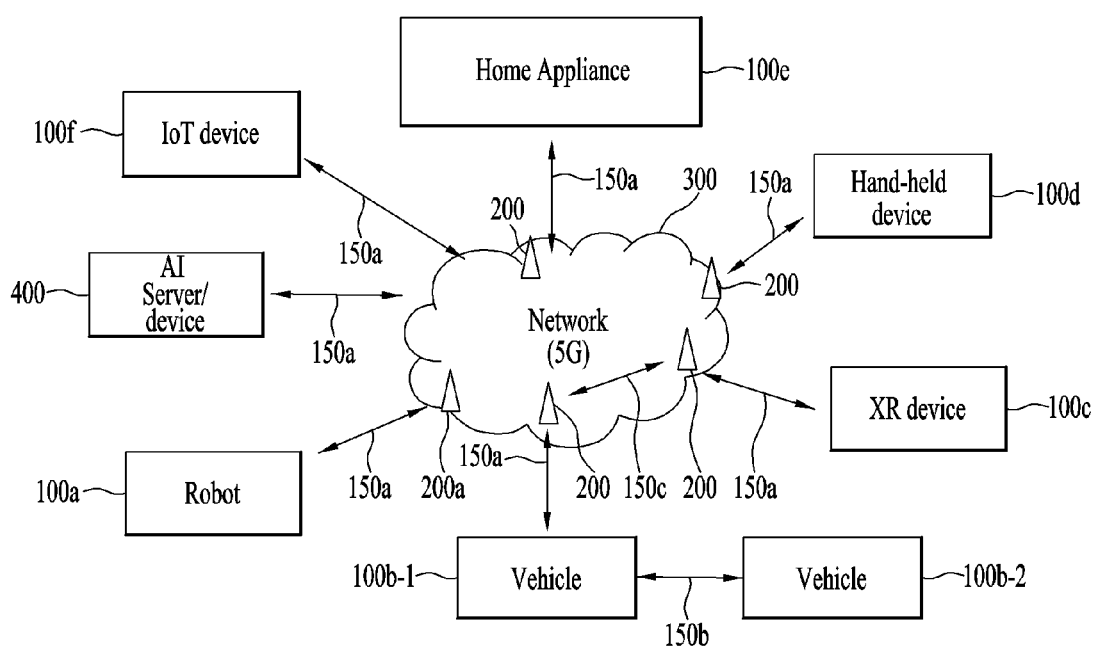
FIG. 26 illustrates an exemplary communication system to which various embodiments of the present disclosure are applied.

FIG. 26 illustrates an exemplary communication system to which various embodiments of the present disclosure are applied.

Referring to FIG. 26, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 27:
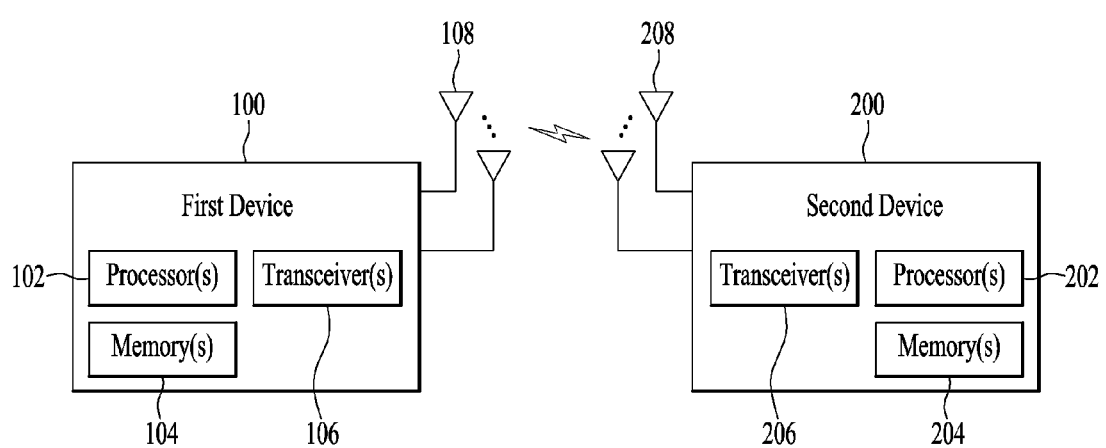
FIG. 27 illustrates exemplary wireless devices to which various embodiments of the present disclosure are applicable.

4.2.1 Example of Wireless Devices to which Various Embodiments of the Present Disclosure are Applied FIG. 27 illustrates exemplary wireless devices to which various embodiments of the present disclosure are applicable.

Referring to FIG. 27, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 28:
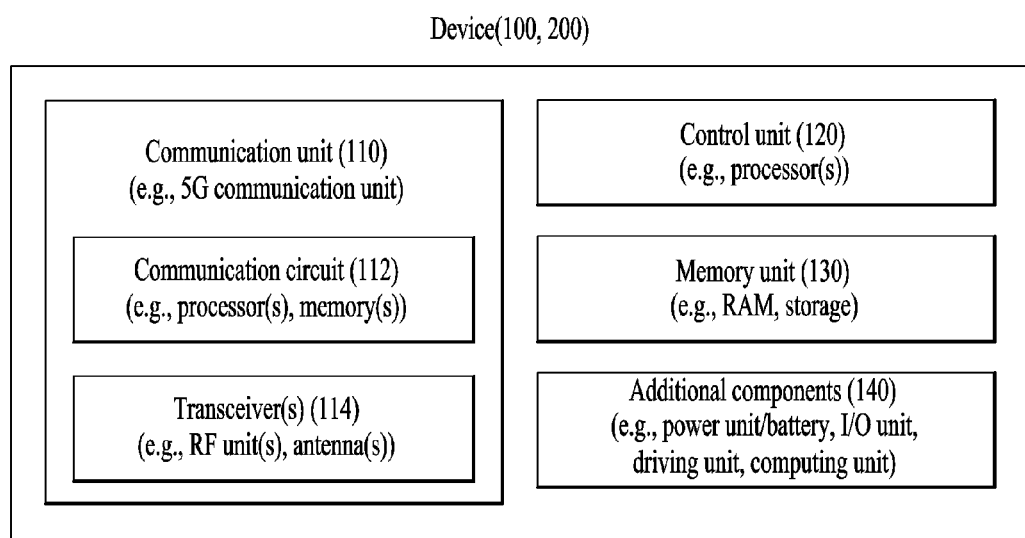
FIG. 28 illustrates other exemplary wireless devices to which various embodiments of the present disclosure are applied.

4.2.2. Example of Using Wireless Devices to which Various Embodiments of the Present Disclosure are Applied FIG. 28 illustrates other exemplary wireless devices to which various embodiments of the present disclosure are applied. The wireless devices may be implemented in various forms according to a use case/service (see FIG. 26).

Referring to FIG. 28, wireless devices 100 and 200 may correspond to the wireless devices 100 and 200 of FIG. 27 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 27. For example, the transceiver(s) 114 may include the one or more transceivers 106 and 206 and/or the one or more antennas 108 and 208 of FIG. 27. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 26), the vehicles (100b-1 and 100b-2 of FIG. 26), the XR device (100c of FIG. 26), the hand-held device (100d of FIG. 26), the home appliance (100e of FIG. 26), the IoT device (100f of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 26), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 28 will be described in detail with reference to the drawings.

Figure 29:
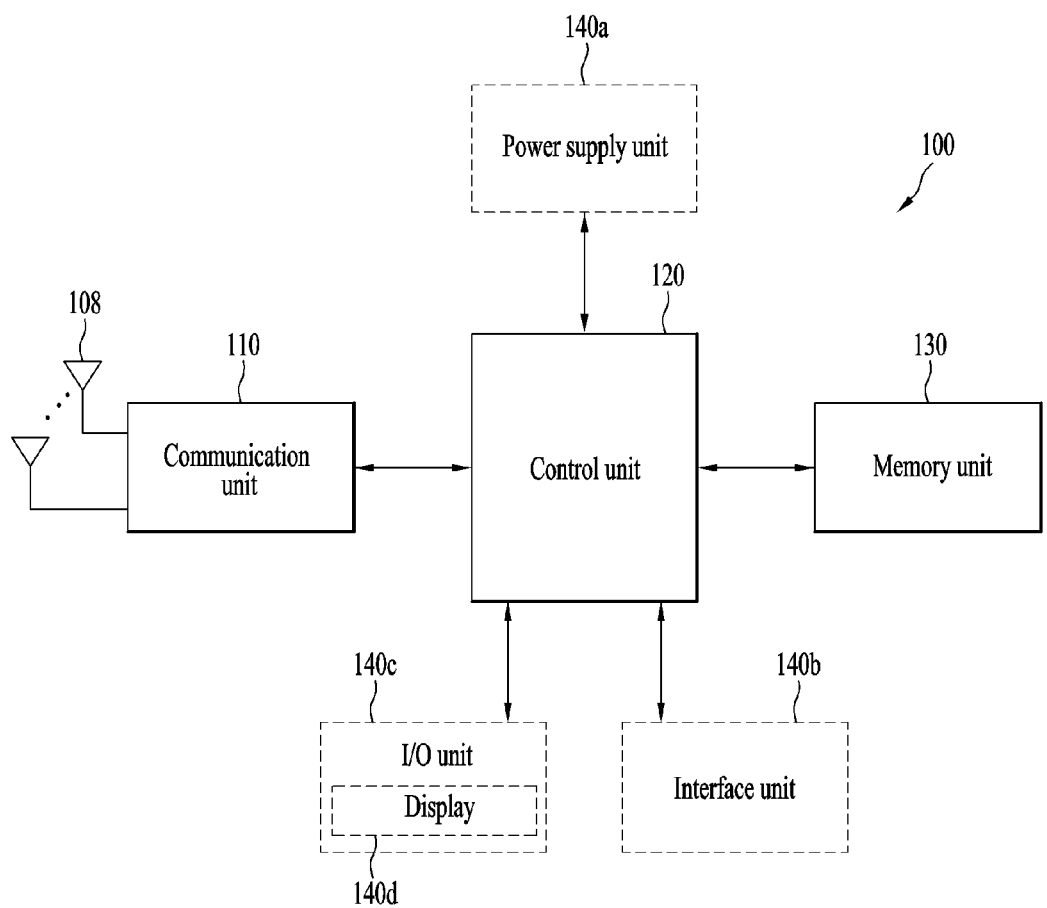
FIG. 29 illustrates an exemplary portable device to which various embodiments of the present disclosure are applied.

4.2.3. Example of Portable Device to which Various Embodiments of the Present Disclosure are Applied FIG. 29 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 29, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 28, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 30:
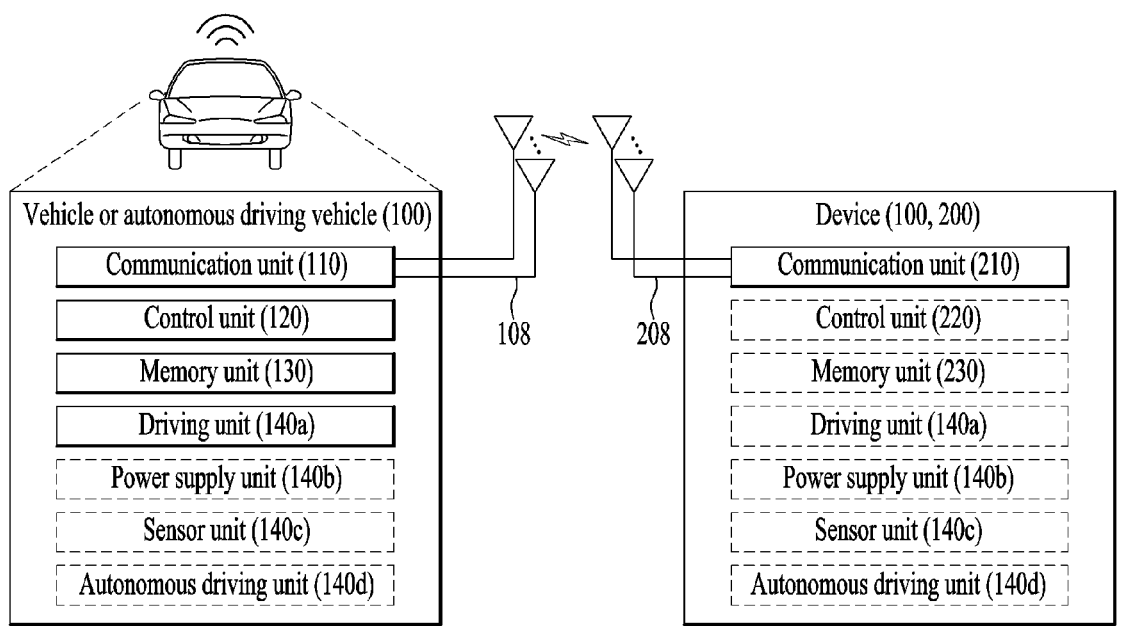
FIG. 30 illustrates an exemplary vehicle or autonomous driving vehicle to which various embodiments of the present disclosure.

4.2.4. Example of Vehicle or Autonomous Driving Vehicle to which Various Embodiments of the Present Disclosure are Applied FIG. 30 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 30, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles, and provide the predicted traffic information data to the vehicles or the autonomous driving vehicles.

Figure 31:
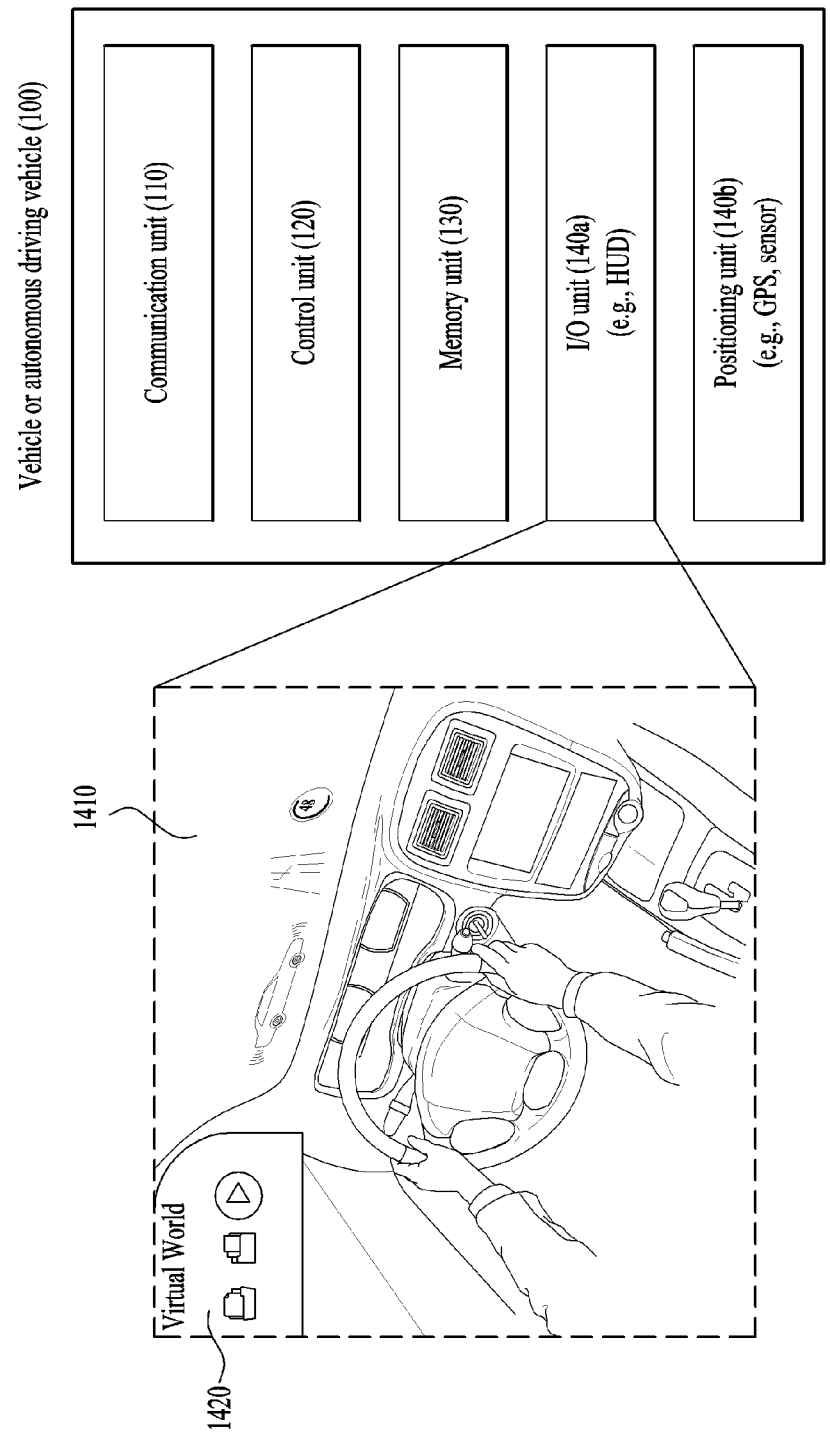
FIG. 31 illustrates an exemplary vehicle to which various embodiments of the present disclosure are applied.

4.2.5. Example of AR/VR and Vehicle to which Various Embodiments of the Present Disclosure are Applied FIG. 31 illustrates an exemplary vehicle to which various embodiments of the present disclosure are applied. The vehicle may be implemented as a transportation means, a train, an aircraft, a ship, or the like.

Referring to FIG. 31, a vehicle 100 may include a communication unit 110, a control unit 120, a memory unit 130, an I/O unit 140*a*, and a positioning unit 140*b*. Herein, the blocks 110 to 130/140*a* and 140*b* correspond to blocks 110 to 130/140 of FIG. 28.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments of present disclosure are applicable to various wireless access systems. Examples of the various wireless access systems include a 3GPP system or a 3GPP2 system. Besides these wireless access systems, the various embodiments of the present disclosure are applicable to all technical fields in which the wireless access systems find their applications. Moreover, the proposed methods are also applicable to an mmWave communication system using an ultra-high frequency band.

The invention claimed is:

1. A method performed by a user equipment (UE) in a wireless communication system, the method comprising:

receiving a synchronization signal/physical broadcast channel (SS/PBCH) block comprising a primary synchronization signal (PSS), a secondary synchronization signal (SSS), and a physical broadcast channel (PBCH);

receiving system information based on the SS/PBCH block;

after the reception of the system information:

receiving information related to a positioning reference signal (PRS) sequence identifier (ID);

receiving a PRS related to the PRS sequence ID;

performing measurements based on the PRS; and reporting a result of the measurements, wherein a pseudo-random sequence generator related to sequence generation of the PRS is initialized according to the following equation:

$$c_{init} = \left(2^{31-(M-10)} \left\lfloor \frac{N_{ID}^{RS}}{2^{10}} \right\rfloor + 2^{10}(K \cdot n_s + l + 1)(2 \cdot N_{ID}^{RS} \bmod 1024) + 1 \right) + N_{ID}^{RS} \bmod 1024 \right) \bmod 2^{31},$$

where M is a natural number, K is a number of orthogonal frequency division multiplexing (OFDM) symbols per slot, $n_s$ is a slot index, l is an OFDM symbol index within a slot, $N_{ID}^{RS}$ is the PRS sequence ID, and mod is a modular operation.

2. The method of claim 1, wherein $N_{ID}^{RS}$ is configured by a higher layer, and wherein the following relationship: $N_{ID}^{RS} \in \{0, 1, \ldots, 2^{19-1}\}$ is satisfied.

3. The method of claim 1, wherein M is a natural number greater than 10 and smaller than 31.

4. The method of claim 1, wherein M is 19.

5. The method of claim 1, wherein a sequence of the PRS satisfies a value obtained from a predetermined length-31 Gold sequence.

6. The method of claim 1, further comprising receiving configuration information comprising:
(i) information on a PRS resource;
(ii) information on a PRS resource set including the PRS resource; and
(iii) information on a transmission and reception point (TRP) ID,
wherein the PRS is received based on the configuration information.

7. An apparatus configured to operate in a wireless communication system, the apparatus comprising:
a transceiver; and
at least one processor coupled with the transceiver,
wherein the at least one processor is configured to:
receive a synchronization signal/physical broadcast channel (SS/PBCH) block comprising a primary synchronization signal (PSS), a secondary synchronization signal (SSS), and a physical broadcast channel (PBCH);
receive system information based on the SS/PBCH block;
after the reception of the system information:
receive information related to a positioning reference signal (PRS) sequence identifier (ID); and
receive a PRS related to the PRS sequence ID, and
wherein a pseudo-random sequence generator related to sequence generation of the PRS is initialized according to the following equation:

$$c_{init} = \left(2^{31-(M-10)}\left\lfloor\frac{N_{ID}^{RS}}{2^{10}}\right\rfloor + 2^{10}(K \cdot n_s + l + 1)(2 \cdot (N_{ID}^{RS} \bmod 1024) + 1) + N_{ID}^{RS} \bmod 1024\right)\bmod 2^{31},$$

where M is a natural number, K is a number of orthogonal frequency division multiplexing (OFDM) symbols per slot, $n_s$ is a slot index, l is an OFDM symbol index within a slot $N^{RS}_{ID}$ is the PRS sequence ID, and mod is a modular operation, and
wherein M is 19.

8. The apparatus of claim 7, wherein $N^{RS}_{ID}$ is configured by a higher layer, and wherein the following relationship: $N^{RS}_{ID} \in \{0, 1, \ldots, 2^{19-1}\}$ is satisfied.

9. The apparatus of claim 7, wherein M is 19.

10. The apparatus of claim 7, wherein a sequence of the PRS satisfies a value obtained from a predetermined length-31 Gold sequence.

11. The apparatus of claim 7, wherein the apparatus is configured to communicate with at least one of a mobile terminal, a network, or an autonomous driving vehicle other than a vehicle including the apparatus.

12. A method performed by an apparatus in a wireless communication system, the method comprising:
transmitting a synchronization signal/physical broadcast channel (SS/PBCH) block comprising a primary synchronization signal (PSS), a secondary synchronization signal (SSS), and a physical broadcast channel (PBCH);
transmitting system information after the transmission of the SS/PBCH block;
after the transmission of the system information:
transmitting information related to a positioning reference signal (PRS) sequence identifier (ID);
transmitting a PRS related to the PRS sequence ID; and
receiving a result of measurements related to the PRS,
wherein a pseudo-random sequence generator related to sequence generation of the PRS is initialized according to the following equation:

$$c_{init} = \left(2^{31-(M-10)}\left\lfloor\frac{N_{ID}^{RS}}{2^{10}}\right\rfloor + 2^{10}(K \cdot n_s + l + 1)(2 \cdot N_{ID}^{RS} \bmod 1024) + 1) + N_{ID}^{RS} \bmod 1024\right)\bmod 2^{31},$$

where M is a natural number, K is a number of orthogonal frequency division multiplexing (OFDM) symbols per slot, $n_s$ is a slot index, l is an OFDM symbol index within a slot, $N^{RS}_{ID}$ the PRS sequence ID, and mod is a modular operation.

13. An apparatus configured to operate in a wireless communication system, the apparatus comprising:
a transceiver; and
at least one processor coupled with the transceiver,
wherein the at least one processor is configured to:
transmit a synchronization signal/physical broadcast channel (SS/PBCH) block comprising a primary synchronization signal (PSS), a secondary synchronization signal (SSS), and a physical broadcast channel (PBCH);
transmit system information after the transmission of the SS/PBCH block;
after the transmission of the system information:
transmit information related to a positioning reference signal (PRS) sequence identifier (ID);
transmit a PRS related to the PRS sequence ID; and
receiving a result of measurements related to the PRS,
wherein a pseudo-random sequence generator related to sequence generation of the PRS is initialized according to the following equation:

$$c_{init} = 2^{31-(M-10)}\left\lfloor\frac{N_{ID}^{RS}}{2^{10}}\right\rfloor + 2^{10}(K \cdot n_s + l + 1)(2 \cdot N_{ID}^{RS} \bmod 1024) + 1) + N_{ID}^{RS} \bmod 1024\right)\bmod 2^{31}.$$

where M is a natural number, K is a number of orthogonal frequency division multiplexing (OFDM) symbols per slot, $n_s$ is a slot index, l is an OFDM symbol index within a slot, $N^{RS}_{ID}$ is the PRS sequence ID, and mod is a modular operation.

* * * * *